US010705884B2

(12) United States Patent
Altintas et al.

(10) Patent No.: US 10,705,884 B2
(45) Date of Patent: Jul. 7, 2020

(54) MANAGING COMPUTATIONAL TASKS IN VEHICLE CONTEXT

(71) Applicant: Toyota Jidosha Kabushiki Kaisha, Toyota-shi, Aichi-ken (JP)

(72) Inventors: Onur Altintas, Sunnyvale, CA (US); Takamasa Higuchi, San Jose, CA (US); Kentaro Oguchi, Sunnyvale, CA (US); Toru Nakanishi, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 166 days.

(21) Appl. No.: 16/034,300

(22) Filed: Jul. 12, 2018

(65) Prior Publication Data
US 2020/0019445 A1 Jan. 16, 2020

(51) Int. Cl.
G06F 9/455 (2018.01)
G06F 9/50 (2006.01)
G06F 9/48 (2006.01)

(52) U.S. Cl.
CPC .......... *G06F 9/5088* (2013.01); *G06F 9/4856* (2013.01); *G06F 9/4881* (2013.01); *G06F 9/5038* (2013.01)

(58) Field of Classification Search
CPC ......... G06F 9/455; B60R 25/00; B60R 11/04; B60R 16/037; B60R 16/0373;
(Continued)

(56) References Cited

U.S. PATENT DOCUMENTS 7,441,241 B2 10/2008 Dawson et al.
7,644,408 B2 1/2010 Kroening
(Continued)

FOREIGN PATENT DOCUMENTS

JP 2006-48501 2/2006
JP 2007-156577 6/2007
JP 2011-128911 6/2011

OTHER PUBLICATIONS

Higuchi et al., How to Keep a Vehicular Micro Cloud Intact , 2018 IEEE 87th Vehicular Technology Conference (VTC Spring) Jun. 2018 IEEE, p. 1-5.
(Continued)

*Primary Examiner* — Dong U Kim
(74) *Attorney, Agent, or Firm* — Patent Law Works LLP

(57) ABSTRACT

A method receives a computational task; determines a processing resource requirement of the computational task; determines available processing resources of a first temporal vehicular virtual server (TVVS) at a first timestamp, the first TVVS comprising first participant vehicles proximally located relative to one another on a road segment at the first timestamp; determines vehicle movement data of the first participant vehicles; estimates available processing resources of the first TVVS at a second timestamp subsequent to the first timestamp based on the vehicle movement data of the first participant vehicles; determines to execute the computational task on the first TVVS based on the processing resource requirement of the computation task, the available processing resources of the first TVVS at the first timestamp, and the estimated available processing resources of the first TVVS at the second timestamp; and assigns the computational task to the first TVVS to execute the computational task.

32 Claims, 12 Drawing Sheets

(58) Field of Classification Search
CPC ... B60R 25/01; B60R 25/1004; B60R 25/102; B60R 25/20; B60R 25/2081; B60R 25/25; B60R 25/257; G01C 21/3691; G05D 1/0088; G05D 2201/0213; G05D 1/0276; G08G 1/096725
See application file for complete search history.

(56) References Cited

U.S. PATENT DOCUMENTS

| | | | |
|---|---|---|---|
| 2014/0229221 A1 | 8/2014 | Shih et al. | |
| 2014/0309870 A1* | 10/2014 | Ricci | G01S 19/42 701/36 |
| 2015/0061895 A1* | 3/2015 | Ricci | G06F 16/25 340/902 |
| 2015/0153187 A1 | 6/2015 | Dong et al. | |
| 2019/0041228 A1* | 2/2019 | Singhal | G05D 1/0088 |
| 2019/0299855 A1* | 10/2019 | Ostapenko | G08G 1/166 |
| 2019/0375422 A1* | 12/2019 | Shtrom | G01S 13/867 |
| 2020/0027196 A1* | 1/2020 | Wolfson | G06T 3/4038 |

OTHER PUBLICATIONS

Jang, et al., The Software-Defined Vehicular Cloud, a New Level of Sharing the Road, Published Apr. 27, 2017, IEEE Vehicular Technology Magazine, Issue Jun. 2017, p. 78-88.

Midya et al., Multi-objective optimization technique for resource allocation and task scheduling in vehicular cloud architecture: A hybrid adaptive nature inspired approach, Journal of Network and Computer Applications, Published online Jul. 20, 2017, p. 58-84, 103.

Foster et al., "The Anatomy of the Grid," Intl. J. Supercomputer Applications, 2001, 24 pgs.

* cited by examiner

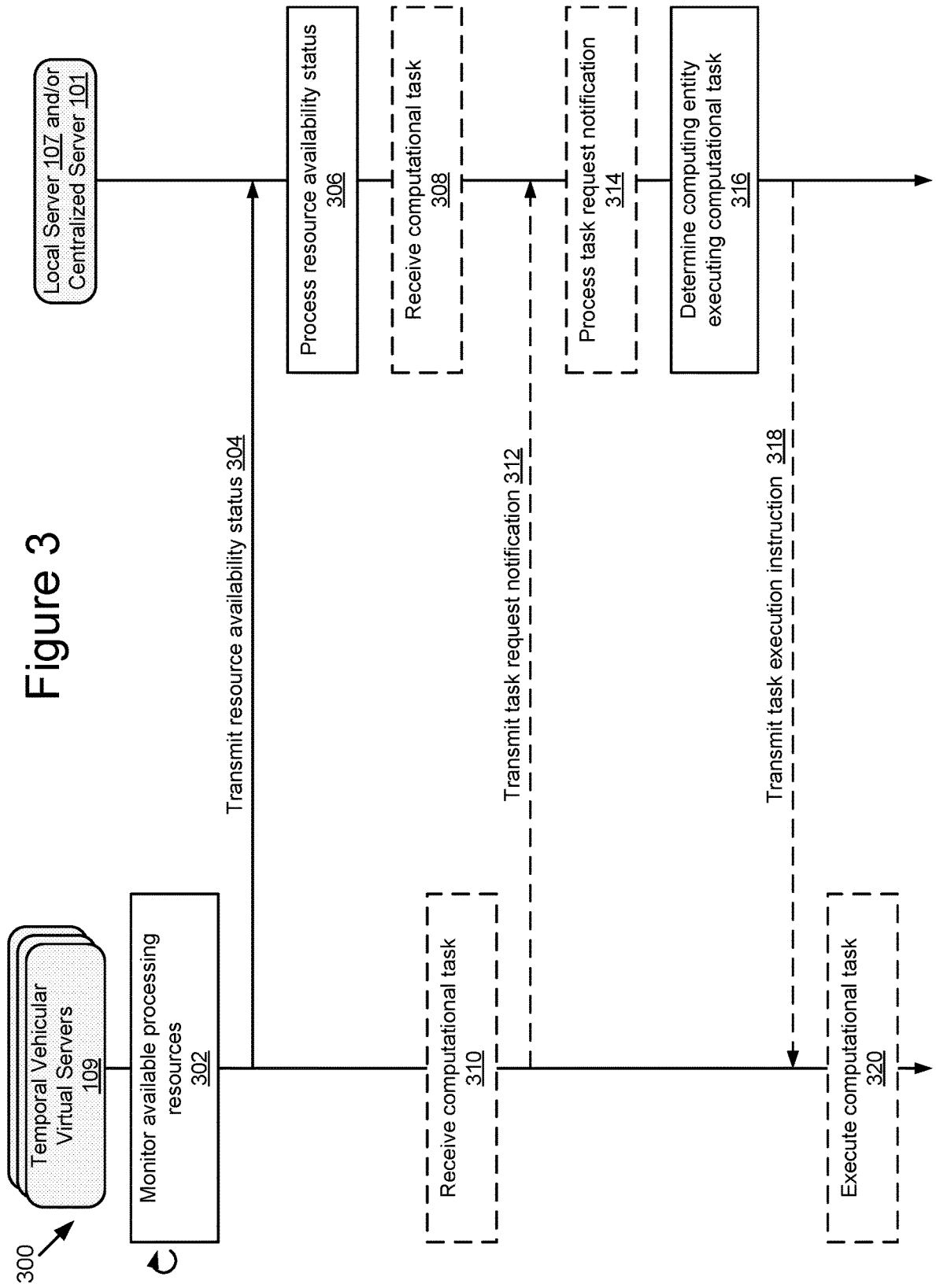

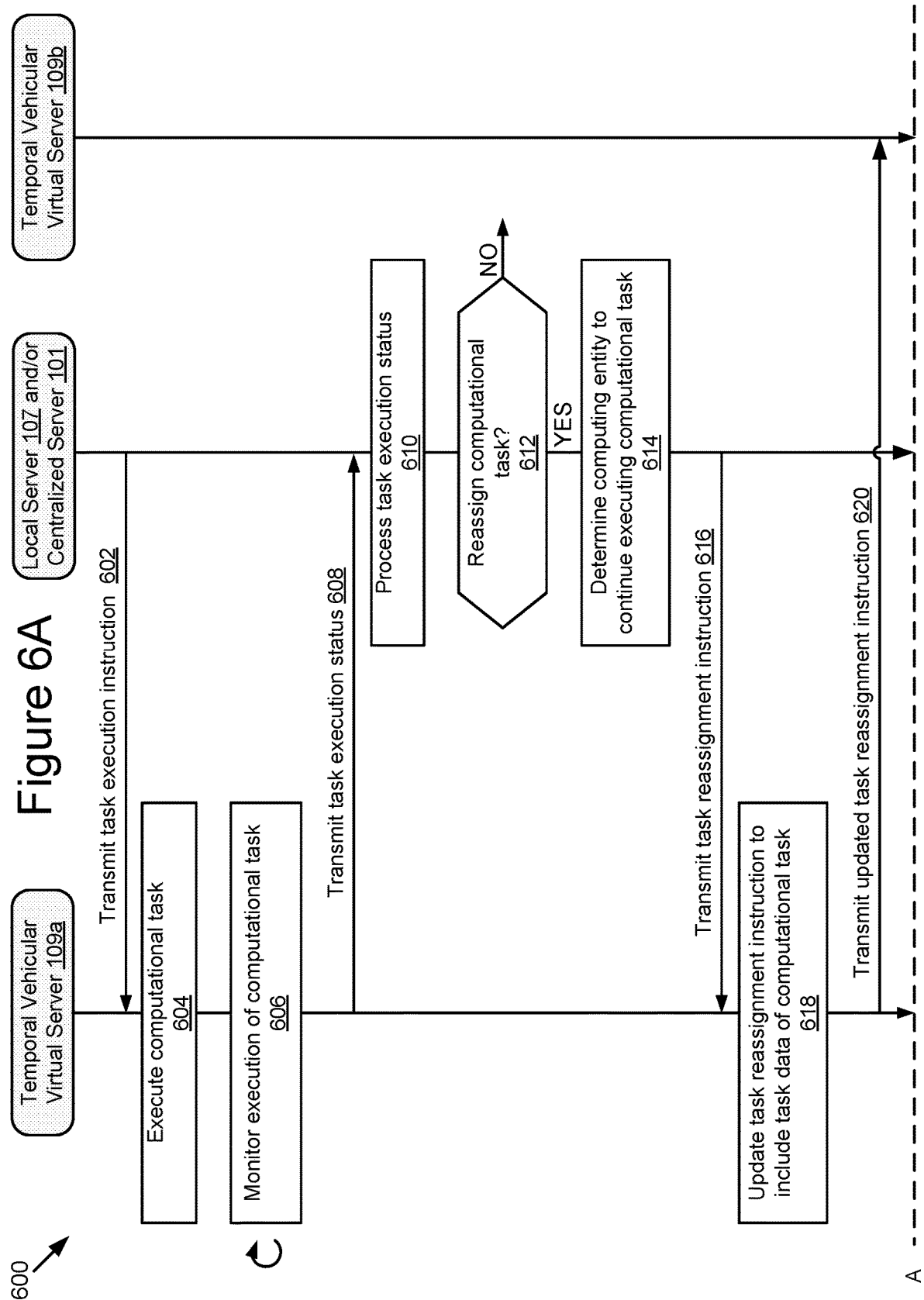

MANAGING COMPUTATIONAL TASKS IN VEHICLE CONTEXT

BACKGROUND

The present disclosure relates to managing computational tasks. In a more particular example, the disclosure relates to technologies for managing computational tasks in a vehicle context.

In the vehicle context, computing systems generally receive input data from vehicles to perform various computational tasks and provide output data of the computational tasks to the vehicles to facilitate their operations. Today, modern computing systems often include multiple computing entities and often rely on resource monitoring to manage computational tasks executed by the computing entities. However, these computing systems often require massive amounts of communication resources for transmitting data to and from the computing entities. Therefore, it is generally impractical or impossible for these computing systems to operate with vehicular networks due to their dynamic and limited communication resources. In addition, the existing solutions usually assign one computational task to multiple computing entities for execution to address potential risk of task failure. As a result, these existing solutions are generally inefficient in utilizing computational resources of the computing entities.

SUMMARY

The subject matter described in this disclosure overcomes the deficiencies and limitations of the existing solutions by providing novel technology for managing computational tasks in the vehicle context.

According to one innovative aspect of the subject matter described in this disclosure, a computer-implemented method comprises: receiving a computational task; determining a processing resource requirement of the computational task; determining available processing resources of a first temporal vehicular virtual server (TVVS) at a first timestamp, the first TVVS comprising first participant vehicles proximally located relative to one another on a road segment at the first timestamp; determining vehicle movement data of the first participant vehicles; estimating available processing resources of the first TVVS at a second timestamp based on the vehicle movement data of the first participant vehicles, the second timestamp being subsequent to the first timestamp; determining to execute the computational task on the first TVVS based on the processing resource requirement of the computation task, the available processing resources of the first TVVS at the first timestamp, and the estimated available processing resources of the first TVVS at the second timestamp; and responsive to determining to execute the computational task on the first TVVS, assigning the computational task to the first TVVS to perform an execution of the computational task.

In general, another innovative aspect of the subject matter described in this disclosure may be embodied in computer-implemented methods comprising: receiving a computational task; determining a processing resource requirement of the computational task; determining, from vehicles on a road segment, candidate participant vehicles proximally located relative to one another on the road segment at a first timestamp; determining vehicle movement data of the candidate participant vehicles; determining available processing resources of a candidate temporal vehicular virtual server (TVVS) at the first timestamp, the candidate TVVS comprising the candidate participant vehicles at the first timestamp; estimating available processing resources of the candidate TVVS at a second timestamp based on the vehicle movement data of the candidate participant vehicles, the second timestamp being subsequent to the first timestamp; determining that the computational task is executable on the candidate TVVS based on the processing resource requirement of the computation task, the available processing resources of the candidate TVVS at the first timestamp, and the estimated available processing resources of the candidate TVVS at the second timestamp; responsive to determining that the computational task is executable on the candidate TVVS, instructing the candidate participant vehicles to form a TVVS; and assigning the computational task to the TVVS to perform an execution of the computational task.

In general, another innovative aspect of the subject matter described in this disclosure may be embodied in systems comprising: one or more processors; one or more memories storing instructions that, when executed by the one or more processors, cause the system to: receive a computational task; determine a processing resource requirement of the computational task; determine available processing resources of a first temporal vehicular virtual server (TVVS) at a first timestamp, the first TVVS comprising first participant vehicles proximally located relative to one another on a road segment at the first timestamp; determine vehicle movement data of the first participant vehicles; estimate available processing resources of the first TVVS at a second timestamp based on the vehicle movement data of the first participant vehicles, the second timestamp being subsequent to the first timestamp; determine to execute the computational task on the first TVVS based on the processing resource requirement of the computation task, the available processing resources of the first TVVS at the first timestamp, and the estimated available processing resources of the first TVVS at the second timestamp; and responsive to determining to execute the computational task on the first TVVS, assign the computational task to the first TVVS to perform an execution of the computational task.

In general, another innovative aspect of the subject matter described in this disclosure may be embodied in systems comprising: one or more processors; one or more memories storing instructions that, when executed by the one or more processors, cause the system to: receive a computational task; determine a processing resource requirement of the computational task; determine, from vehicles on a road segment, candidate participant vehicles proximally located relative to one another on the road segment at a first timestamp; determine vehicle movement data of the candidate participant vehicles; determine available processing resources of a candidate temporal vehicular virtual server (TVVS) at the first timestamp, the candidate TVVS comprising the candidate participant vehicles at the first timestamp; estimate available processing resources of the candidate TVVS at a second timestamp based on the vehicle movement data of the candidate participant vehicles, the second timestamp being subsequent to the first timestamp; determine that the computational task is executable on the candidate TVVS based on the processing resource requirement of the computation task, the available processing resources of the candidate TVVS at the first timestamp, and the estimated available processing resources of the candidate TVVS at the second timestamp; responsive to determining that the computational task is executable on the candidate TVVS, instruct the candidate participant vehicles to form a TVVS; and assign the computational task to the TVVS to perform an execution of the computational task.

These and other implementations may each optionally include one or more of the following features: that estimating the available processing resources of the first TVVS at the second timestamp includes determining, from the first participant vehicles, second participant vehicles proximally located relative to one another on the road segment at the second timestamp based on the vehicle movement data of the first participant vehicles, the first TVVS comprising the second participant vehicles at the second timestamp, and aggregating available processing resources of the second participant vehicles into the estimated available processing resources of the first TVVS at the second timestamp; that determining the second timestamp based on the first timestamp and a task duration of the computational task; that the vehicle movement data of each participant vehicle included in the first participant vehicles specifies one or more of a vehicle speed, a vehicle geolocation, and a vehicle route of the participant vehicle; that determining, at a first checkpoint timestamp during the execution of the computational task, a completion processing resource requirement of the computational task, determining available processing resources of the first TVVS at the first checkpoint timestamp, determining that the first TVVS is incapable of completing the execution of the computational task based on the completion processing resource requirement of the computational task and the available processing resources of the first TVVS at the first checkpoint timestamp, and responsive to determining that the first TVVS is incapable of completing the execution of the computational task, reassigning the computational task; that determining, at a first checkpoint timestamp during the execution of the computational task, a completion processing resource requirement of the computational task, determining that the first TVVS comprising second participant vehicles at the first checkpoint timestamp, estimating available processing resources of the first TVVS at a second checkpoint timestamp based on vehicle movement data of the second participant vehicles, the second checkpoint timestamp being subsequent to the first checkpoint timestamp, determining that the first TVVS is incapable of completing the execution of the computational task based on the completion processing resource requirement of the computational task and the estimated available processing resources of the first TVVS at the second checkpoint timestamp, and responsive to determining that the first TVVS is incapable of completing the execution of the computational task, reassigning the computational task; that determining a task progress metric of the computational task, determining that the task progress metric of the computational task satisfies a predefined task progress threshold, and responsive to determining that the task progress metric of the computational task satisfies the predefined task progress threshold, reassigning the computational task; that determining that the computational task is to be reassigned at a checkpoint timestamp during the execution of the computational task, determining a completion processing resource requirement of the computational task, determining a set of TVVSs, each TVVS of the set comprising participant vehicles proximally located relative to one another on the road segment at the checkpoint timestamp, each TVVS having available processing resources at the checkpoint timestamp and estimated available processing resources at the second timestamp, selecting, from the set of TVVSs, a second TVVS based on the completion processing resource requirement of the computational task, the available processing resources of the second TVVS at the checkpoint timestamp, and the estimated available processing resources of the second TVVS at the second timestamp, and reassigning the computational task to the second TVVS to continue the execution of the computational task; that determining that the computational task is to be reassigned at a checkpoint timestamp during the execution of the computational task, determining a communication profile of the computational task, determining a geographic location of the first TVVS at the checkpoint timestamp, determining a geographic location of a second TVVS at the checkpoint timestamp, the second TVVS comprising participant vehicles proximally located relative to one another on the road segment at the checkpoint timestamp, determining a communication resource requirement of the computational task associated with the second TVVS using the communication profile of the computational task, the geographic location of the first TVVS at the checkpoint timestamp, and the geographic location of the second TVVS at the checkpoint timestamp, determining to reassign the computational task to the second TVVS based on the communication resource requirement of the computational task associated with the second TVVS, and responsive to determining to reassign the computational task to the second TVVS, reassigning the computational task to the second TVVS to continue the execution of the computational task; that the communication profile of the computational task specifies one or more of an input data size of task input data, an output data size of task output data, a task execution data size, a frequency of request for the task input data, a frequency of request for the task output data associated with the computational task, a geographical location of one or more computing entities from which the task input data of the computational task is received, and a geographical location of one or more computing entities to which the task output data the computational task is transmitted; that determining that task input data of the computational task is associated with the road segmen, and instructing the first TVVS to determine additional input data associated with the road segment, the additional input data being generated by one or more sensors of the first participant vehicles included in the first TVVS, and perform the execution of the computational task using the task input data of the computational task and the additional input data generated by the one or more sensors of the first participant vehicles.

These and other implementations may each optionally include one or more of the following features: that the candidate participant vehicles have a relative distance to one another on the road segment satisfying a predefined relative distance threshold; that determining that the computational task is executable on the candidate TVVS includes determining that the available processing resources of the candidate TVVS at the first timestamp satisfies the processing resource requirement of the computational task, and determining that the estimated available processing resources of the candidate TVVS at the second timestamp satisfies the processing resource requirement of the computational task; that determining the second timestamp based on the first timestamp and a task duration of the computational task; that estimating the available processing resources of the candidate TVVS at the second timestamp includes determining, from the candidate participant vehicles, first candidate participant vehicles proximally located relative to one another on the road segment at the second timestamp based on the vehicle movement data of the candidate participant vehicles, the candidate TVVS comprising the first candidate participant vehicles at the second timestamp, and aggregating available processing resources of the first candidate participant vehicles into the estimated available processing resources of the candidate TVVS at the second timestamp.

Other implementations of one or more of these and other aspects include corresponding systems, apparatus, and computer programs, configured to perform the actions of methods, encoded on non-transitory computer storage devices.

The novel technology for managing computational tasks in the vehicle context presented in this disclosure is particularly advantageous in a number of respects. For example, the technology described herein is capable of monitoring and estimating the available processing resources of the computing entities (e.g., temporal vehicular virtual servers), and reassigning a computational task from a current computing entity executing the computational task to another computing entity if necessary. As the computational task is reassigned before the temporal vehicular virtual server currently executing the computational task dissolves and/or before the available processing resources of the current computing entity become insufficient to complete the computational task, the present technology can avoid redundantly assigning the computational task to multiple computing entities of the computing system. As a result, the utilization of the processing resources provided by the computing system can be optimized without increasing the risk of task failure or degrading the quality of service. As a further example, the present technology is capable of assigning the computational tasks to the computing entities based on communication profile of the communication tasks. Therefore, each computational task can be executed by a computing entity that minimizes the communication resources required for receiving and distributing relevant data of the communication task, and/or minimizes the communication bandwidth over communication networks that incur monetary costs for data transmission.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIG. 3 is a flowchart of an example method for assigning a computational task.

FIGS. 6A and 6B illustrate a flowchart of a first example method for reassigning a computational task.

DESCRIPTION

The technology described herein can effectively manage computational vehicular tasks. As described in further detail below, the technology includes various aspects, such as but not limited to methods and corresponding systems, that can determine available processing resources of a first temporal vehicular virtual server (TVVS) at a first timestamp, receive vehicle movement data of first participant vehicles included in the first TVVS at the first timestamp, and estimate available processing resources of the first TVVS at a second timestamp subsequent to the first timestamp based on the vehicle movement data of first participant vehicles. The available processing resources of the first TVVS at the first timestamp and the estimated available processing resources of the first TVVS at the second timestamp may be used to determine whether to execute a computational task having a processing resource requirement on the first TVVS, and assign the computational task to the first TVVS accordingly. During the execution of the computational task, the computational task may be reassigned to a second TVVS or to a stationary computing server to continue the task execution if necessary.

Figure 1A:
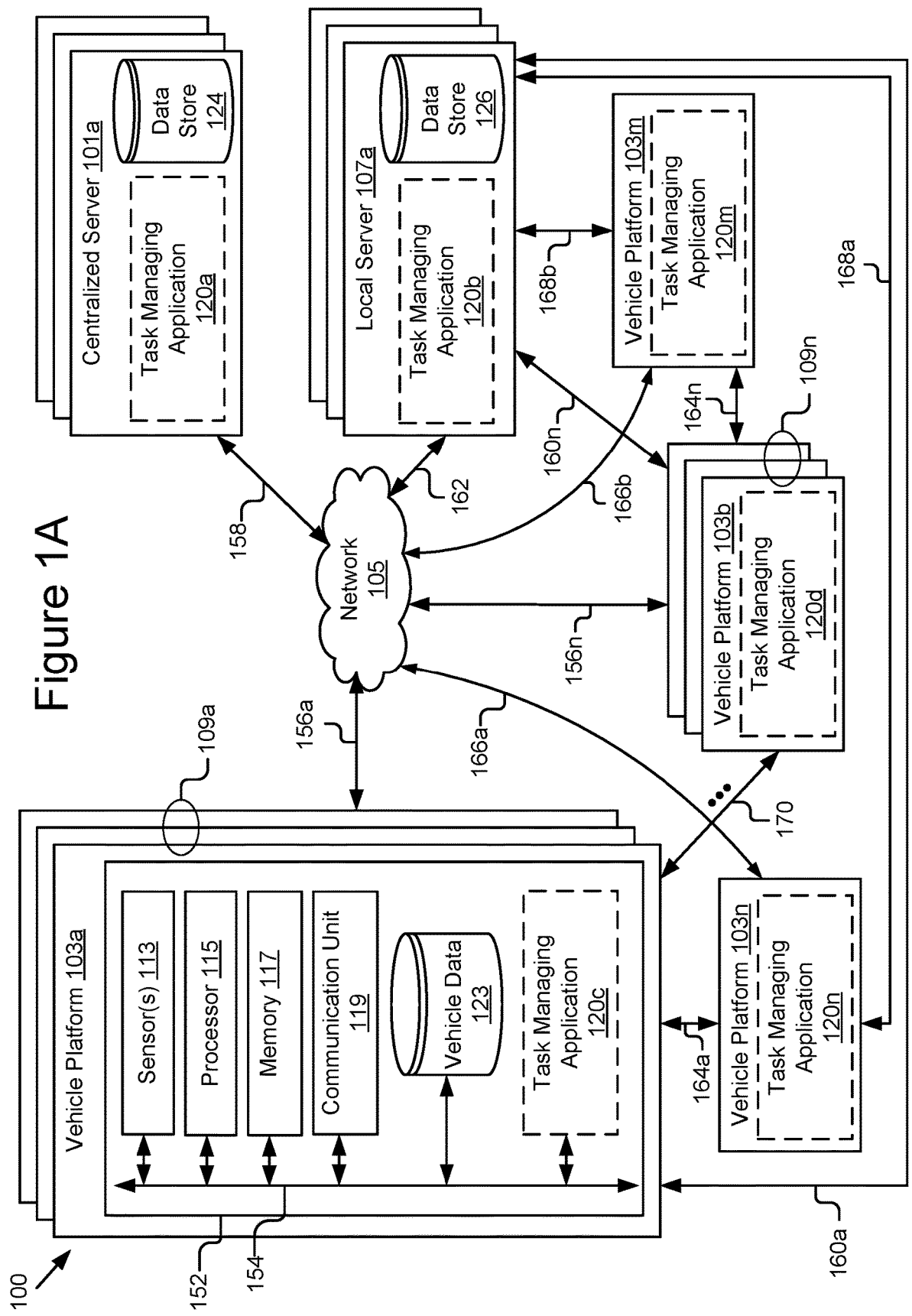
FIG. 1A is a block diagram of an example system for managing computational tasks in a vehicle context.

FIG. 1A is a block diagram of an example system 100 for managing computational tasks. As shown, the system 100 includes one or more centralized servers 101a ... 101n, one or more local servers 107a ... 107n, one or more vehicle platforms 103a ... 103n, and one or more temporal vehicular virtual servers (TVVS) 109a ... 109n. As depicted, each TVVS 109 may comprise one or more vehicle platforms 103 connected to each other to form a vehicle cluster, the vehicle platforms 103 in the vehicle cluster may contribute their available processing resources to collaboratively perform the functionalities of the temporal vehicular virtual server (TVVS) 109. The centralized servers 101 and the local servers 107 may be stationary computing servers and may be coupled for electronic communication via a network 105. The TVVS 109 may be communicatively coupled to the network 105 as reflected by signal line 156, communicatively coupled to the local servers 107 as reflected by signal line 160, and communicatively coupled to other TVVSs 109 as reflected by signal line 170. The vehicle platforms 103 may be communicatively coupled to the TVVSs 109 as reflected by signal line 164, communicatively coupled to local servers 107 as reflected by signal line 168, and communicatively coupled to other components of the system 100 via the network 105 through the signal line 166.

In FIG. 1A and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1A is provided by way of example and the system 100 and/or further systems contemplated by this present disclosure may include additional and/or fewer components, may combine components and/or divide one or more of the components into additional components, etc. For example, the system 100 may include any number of vehicle platforms 103, TVVSs 109, networks 105, local servers 107, or centralized servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-infrastructure/infrastructure-to-vehicle (V2I/I2V) networks, vehicle-to-infrastructure/infrastructure-to-cloud (V2I/I2C) networks, vehicle-to-infrastructure/vehicle-to-everything (V2I/V2X) networks, vehicle-to-vehicle (V2V) networks, cellular networks, or any other wireless networks. In some embodiments, the network 105 may incur monetary cost for each data transmission over the network 105. Although FIG. 1A illustrates a single block for the network 105 that couples to the centralized server(s) 101, the local server(s) 107, and/or the TVVS(s) 109, it should be understood that the network 105 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 123, and a task managing application 120. Examples of computing device(s) 152 may include virtual or physical computer processors, control units, micro-controllers, etc., which are coupled to other components of the vehicle platform(s) 103, such as one or more sensors 113, actuators, motivators, etc. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

Figure 1B:
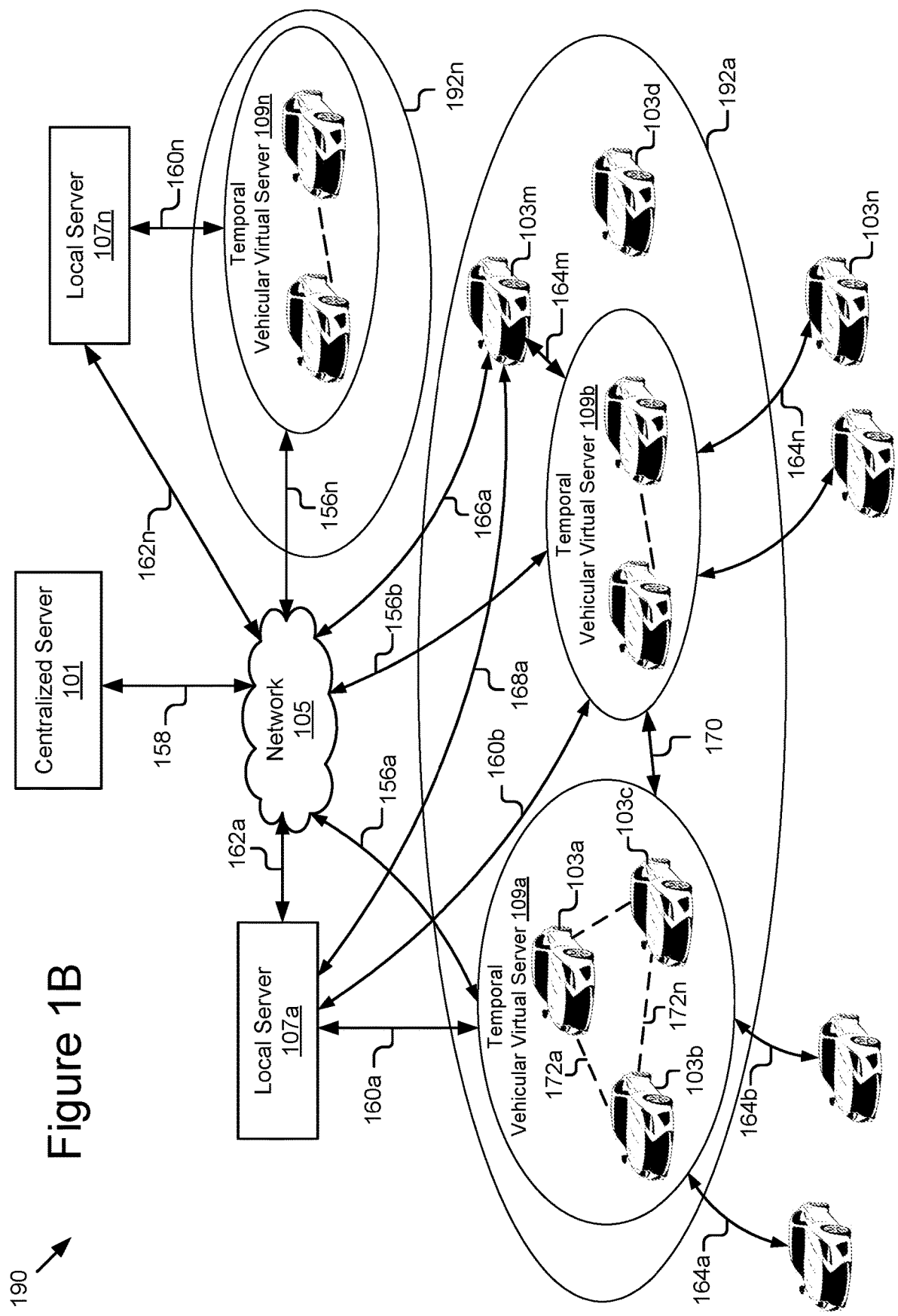
FIG. 1B is a structure diagram of an example system for managing computational tasks in a vehicle context.

In some embodiments, the vehicle platform(s) 103 may be communicatively coupled to one another via vehicle-to-vehicle (V2V) connections (e.g., DSRC, WiFi™, etc.) to send and receive data to and from one another as the vehicle platform(s) 103 travel along the roads. As an example, FIG. 1B illustrates a structure diagram 190 of the system 100 with multiple communication connections between various components of the system 100. As depicted in FIG. 1B, each vehicle platform 103 can establish V2V connections with nearby vehicle platforms 103 (e.g., the signal line 172, etc.) to form a vehicle cluster that performs the functionalities of a temporal vehicular virtual server (TVVS) 109. In some embodiments, the TVVS 109 may send and receive data to and from other vehicle platforms 103 via the V2V connections (e.g., the signal line 164, etc.). The TVVS 109 may also send and receive data to and from other TVVSs 109 via the V2V connections (e.g., the signal line 170, etc.). The implementation of the V2V connections 164 and the V2V connections 170 for data transmission among the vehicle platforms 103 and the TVVSs 109 is particularly advantageous, because it can significantly reduce the transmission latency and monetary cost for sending and receiving data to and from these entities.

In some embodiments, the vehicle platform(s) 103 may be communicatively coupled to the local server(s) 107 to send and receive data to and from the local server(s) 107 via vehicle-to-infrastructure (V2I) connections (e.g., the signal line 168). In particular, in some embodiments, the local server 107 may be a computing infrastructure located on the roadside of the road segment on which the vehicle platform 103 travel. Therefore, the vehicle platform 103 may establish the V2I connection 168 with the local server 107 to send and receive data to and from the local server 107. In some embodiments, the vehicle platform(s) 103 may also be communicatively coupled to the network 105 to send and receive data to and from other components of the system 100 via the network 105. For example, the vehicle platform(s) 103 may send and receive data to and from the centralized servers 101, the local servers 107, the TVVSs 109, other vehicle platforms 103, etc. via the network 105 through the network connections (e.g., the signal line 166). As discussed elsewhere herein, in some embodiments, the data transmission via the network 105 through the network connections 166 may incur monetary cost.

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data (e.g., the Global Positioning System (GPS) data), the resource data (e.g., the processing capacity data), etc. as vehicle operation data in the vehicle data store 123 for access and/or retrieval by the task managing application 120. In some implementations, the processor(s) 115 may be capable of generating and providing electronic display signals to the input/output device(s), supporting the display of images, capturing and transmitting images, performing complex tasks including various types of task execution monitoring and resource estimation, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or the vehicle data store 123.

The task managing application 120 is computer logic executable to manage computational tasks in vehicle context. As illustrated in FIG. 1A, the centralized servers 101 may include the instances 120a, the local servers 107 may include the instances 120b, the vehicle platform 103a ... 103n may include the instances 120c ... 120n, and the temporal vehicular virtual servers (TVVS) 109 may include the virtual instances 120p (not shown) of the task managing application 120. In some embodiments, the virtual instance 120p included in a temporal vehicular virtual server (TVVS) 109 may be implemented in a centralized manner. For example, the virtual instance 120p may be the instance 120 of a vehicle platform 103 included in the vehicle cluster that forms the temporal vehicular virtual server (TVVS) 109. In some embodiments, the virtual instance 120p may be implemented in a distributed manner. For example, the instances 120 included in multiple vehicle platforms 103 of the vehicle cluster may collaboratively perform the functionalities of the virtual instance 120p. In some embodiments, each instance 120a . . . 120n and 120p may comprise one or more components the task managing application 120 depicted in FIG. 2A, and may be configured to fully or partially perform the functionalities described herein depending on where the instance resides.

In some embodiments, the task managing application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The task managing application 120 may receive and process the vehicle data and communicate with other elements of the vehicle platform 103 via the bus 154, such as the memory 117, the communication unit 119, the vehicle data store 123, etc. The task managing application 120 is described in details below with reference to at least FIGS. 1B-9.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the task managing application 120. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via V2V connections 164, via V2I connections 168, and/or via the network 105 through the network connections 166). The communication unit 119 may include one or more wired interfaces and/or wireless transceivers to send and receive data using wired and/or wireless connections. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors (e.g., GPS sensors), orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103. In some embodiments, as the vehicle platforms 103 may connect to one another to form the temporal vehicular virtual server (TVVS) 109, the TVVS 109 may also have the sensing capabilities provided by the sensors 113 of these multiple vehicle platforms 103.

The vehicle data store 123 includes a non-transitory storage medium that stores various types of data. For example, the vehicle data store 123 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., acceleration, deceleration, wheel speed (Revolutions Per Minute—RPM), steering angle, braking force, etc. In some embodiments, the vehicle data may include a vehicle identifier (ID) uniquely identifying the vehicle platform 103 (e.g., Vehicle Identification Number (VIN)) and/or a temporal vehicular virtual server ID uniquely identifying the temporal vehicular virtual server (TVVS) 109 that comprises the vehicle platform 103 as a participant vehicle. In some embodiments, the vehicle data may also include vehicle movement data describing the vehicle movement of the vehicle platform 103. In some embodiments, the vehicle movement data may include the vehicle speed, the vehicle geolocation (e.g., GPS coordinates) indicating the geographic location of the vehicle platform 103, the vehicle route currently followed by the vehicle platform 103 to get to a destination, etc. Other types of vehicle movement data are also possible and contemplated.

In some embodiments, the vehicle data store 123 may store resource availability data of the vehicle platform 103. In some embodiments, the resource availability data of the vehicle platform 103 may include multiple resource availability entries, each resource availability entry may describe the available processing resources of the vehicle platform 103 at a particular timestamp. In particular, the resource availability entry may indicate the quantities of various resource components available for use in the vehicle platform 103 at the particular timestamp. In some embodiments, the resource availability entry may include the amount of available computing resource (e.g., number of available Central Processing Unit (CPU) cycles), the amount of available data storage resource (e.g., capacity of free storage space), the amount of available memory resource (e.g., capacity of free memory space), the amount of available communication resource (e.g., unoccupied communication bandwidth), the amount of available sensing resource (e.g., the amount of sensor data captured by the sensors 113), etc. of the vehicle platform 103. As an example, the resource availability entry associated with a first timestamp $t=t_1$ may indicate that at the first timestamp $t=t_1$, the vehicle platform 103 has the available computing resource of 1 GHz (e.g., $10^9$ CPU cycles), the available data storage resource of 1.5 GB, the available memory resource of 500 MB, the available communication resource of 2 Mbps, and the sensing resource including 4 road scene images captured by the image sensors 113 of the vehicle platform 103 at the first timestamp $t=t_1$.

In some embodiments, the vehicle data store 123 may be part of a data storage system (e.g., a standard data or database management system) for storing and providing access to data. Other types of data stored in the vehicle data store 123 are also possible and contemplated.

The temporal vehicular virtual server (TVVS) 109 is a virtual vehicular server being formed by one or more vehicle platforms 103. In some embodiments, the vehicle platforms 103 proximately located relative to one another on a road segment may connect to one another via V2V connections 172 to create a vehicle cluster. The vehicle platforms 103 included in the vehicle cluster may contribute their available processing resources (e.g., processing capacity, data storage space, memory space, communication bandwidth, etc.) into a resource pool to collaboratively perform the functionalities of the temporal vehicular virtual server (TVVS) 109. In some embodiments, the vehicle platforms 103 included in the vehicle cluster that performs the functionalities of the temporal vehicular virtual server (TVVS) 109 may be referred to as participant vehicles of the temporal vehicular virtual server (TVVS) 109. In some embodiments, the temporal vehicular virtual server (TVVS) 109 is capable of transporting from one point to another on a road segment as the participant vehicles of the temporal vehicular virtual server (TVVS) 109 travel along the road segment.

In some embodiments, in order for a vehicle platform 103 to be a participant vehicle of the temporal vehicular virtual server (TVVS) 109, the relative distance of the vehicle platform 103 to other participant vehicles of the temporal vehicular virtual server (TVVS) 109 may need to satisfy a predefined relative distance threshold (e.g., 150m). As the vehicle platform 103 travels along the road segment, such relative distance may vary over time and the vehicle platform 103 may dynamically participate in or depart from the vehicle cluster of the temporal vehicular virtual server (TVVS) 109. Because each participant vehicle may dynamically join and leave the vehicle cluster of the temporal vehicular virtual server (TVVS) 109, the available processing resources of the temporal vehicular virtual server (TVVS) 109 contributed by these participant vehicles may significantly change according to their vehicle movements. The existence of the temporal vehicular virtual server (TVVS) 109 may also be temporary.

As depicted in FIG. 1B, the TVVS 109 may be communicatively coupled to other vehicle platforms 103 to send and receive data to and from other vehicle platforms 103 via the V2V connections 164. The TVVS 109 may also be communicatively coupled to other TVVSs 109 to send and receive data to and from other TVVSs 109 via the V2V connections 170. In some embodiments, the TVVS 109 may be communicatively coupled to the local servers 107 to send and receive data to and from the local servers 107 via the V2I connections (e.g., the signal line 160). In particular, in some embodiments, the local server 107 may be a computing infrastructure located on the roadside of the road segment on which the participant vehicles of the temporal vehicular virtual server (TVVS) 109 travel. Therefore, the TVVS 109 may establish the V2I connection 160 with the local server 107 to send and receive data to and from the local server 107. In some embodiments, the TVVS 109 may also be communicatively coupled to the network 105 to send and receive data to and from other components of the system 100 via the network 105. For example, the TVVS 109 may send and receive data to and from the centralized servers 101, the local servers 107, other TVVSs 109, etc. via the network 105 through the network connections (e.g., the signal line 156). As discussed elsewhere herein, in some embodiments, the data transmission via the network 105 through the network connections 156 may incur monetary cost.

In some embodiments, the temporal vehicular virtual server (TVVS) 109 may include a virtual processor, a virtual memory, and a virtual communication unit virtualized from the available processing resources contributed by the participant vehicles of the temporal vehicular virtual server (TVVS) 109. In some embodiments, the temporal vehicular virtual server 109 may include a virtual instance 120p of the task managing application 120 and a virtual data store 128 (not shown). In some embodiments, the participant vehicles of the temporal vehicular virtual server (TVVS) 109 may contribute the data storage resource of their vehicle data stores 123 to form the virtual data store 128. Thus, the virtual data store 128 may include a non-transitory storage medium that stores various types of data for access and/or retrieval by the task managing application 120.

In some embodiments, the virtual data store 128 may store the unique temporal vehicular virtual server ID of the TVVS 109, the geolocation indicating geographic location (e.g., GPS coordinates) of the TVVS 109, and vehicle cluster data describing the vehicle cluster that forms the temporal vehicular virtual server (TVVS) 109. In some embodiments, the geolocation of the TVVS 109 may be the geographic location of a leading vehicle platform 103 that initiates the vehicle cluster and/or coordinates the establishment of the temporal vehicular virtual server (TVVS) 109. In some embodiments, the vehicle cluster data may include one or more participant vehicle entries, each participant vehicle entry may describe a participant vehicle in the vehicle cluster of the temporal vehicular virtual server (TVVS) 109. In some embodiments, the participant vehicle entry may include the vehicle ID of the participant vehicle, the vehicle movement data of the participant vehicle, the participation start time at which the participant vehicle joined the vehicle cluster, the participation end time at which the participant vehicle left or potentially leaves the vehicle cluster, etc. As discussed elsewhere herein, the vehicle movement data of the participant vehicle may include the vehicle speed, the vehicle geolocation (e.g., GPS coordinates), the vehicle route, etc. of the participant vehicle.

In some embodiments, the virtual data store 128 may store resource data describing the resource pool of the temporal vehicular virtual server (TVVS) 109. In some embodiments, the resource data may include resource availability data, resource mapping data, resource allocation data, etc. associated with the TVVS 109. In some embodiments, the resource availability data of the TVVS 109 may include multiple resource availability entries, each resource availability entry may describe the available processing resources of the TVVS 109 at a particular timestamp. In particular, the resource availability entry may indicate the quantities of available processing resources contributed by each participant vehicle of the temporal vehicular virtual server (TVVS) 109 at the particular timestamp, and the total quantities of available processing resources in the resource pool of the TVVS 109 at the particular timestamp.

In some embodiments, the available processing resource contributed by the participant vehicles of the temporal vehicular virtual server (TVVS) 109 may include multiple physical resource units. These physical resource units may be organized and/or aggregated into multiple virtual resource units of the TVVS 109 using virtualization techniques. In some embodiments, for each virtual resource unit in the resource pool of the TVVS 109, the resource mapping data of the TVVS 109 may map the virtual resource unit to one or more corresponding physical resource units of one or more participant vehicles. In some embodiments, the virtual resource units in the resource pool of the TVVS 109 may be allocated to various computational tasks to perform the task execution as needed. In some embodiments, if a virtual resource unit is allocated to a computational task, the resource allocation data of the TVVS 109 may specify the computational task to which the virtual resource unit is allocated. In some embodiments, the resource data of the TVVS 109 may include other types of resource mapping data and resource allocation data.

In some embodiments, the virtual data store 128 may store a task execution list of the TVVS 109. The task execution list may include one or more computational task entries, each computational task entry may describe a computational task assigned to the TVVS 109 to perform the task execution. In some embodiments, the computational task may be a unit of processing workload to be assigned to and/or executed by a computing entity of the system 100 (e.g., the centralized servers 101, the local servers 107, the TVVSs 109, the vehicle platforms 103, etc.). The computing entity that executes the computational task may be referred to as the computing entity hosting the computational task. The execution of the computational task may include retrieving and/or receiving task input data of the computational task, processing the task input data to generate task output data of the computational task, and transmitting the task output data of the computational task to one or more requesting entities. In some embodiments, the execution of the computational task may include one or more processing operations. Non-limiting examples of the processing operations include, but are not limited to, data sensing operations, data processing operations, data storing operations, data communicating operations, etc. In some embodiments, each processing operation may itself be considered a computational task and may be performed by different computing entities. Other types of processing operation are also possible and contemplated.

As an example, the execution of a computational task performed by the TVVS 109 may include receiving road scene images captured by first vehicle platforms 103 located on a road segment, processing the road scene images to generate a dynamic map of the road segment, transmitting the dynamic map of the road segment to second vehicle platforms 103 located in a proximate geographic region (e.g., the geographic region within a radius of 2 miles from the road segment), and storing the dynamic map of the road segment in the virtual data store 128 for later retrieval upon request of other entities. In this example, the execution of the computational task may include the data sensing operations and the data communicating operations performed by the first vehicle platforms 103, the data processing operations, the data storing operations, and the data communicating operations performed by the TVVS 109, and/or the data communicating operations performed by the second vehicle platforms 103.

As discussed above, the task execution list of the TVVS 109 stored in the virtual data store 128 may include one or more computational task entries, each computational task entry may include various types of task data describing a computational task. In some embodiments, the task data of the computational task may include task metadata specifying multiple properties of the computational task. Non-limiting examples of the task metadata include, but are not limited to, the unique task ID of the computational task, the task category to which the computational task is classified (e.g., task category of "image processing tasks," task category of "map generation tasks," etc.), the task priority metric indicating the priority level of the computational task (e.g., task priority metric of 0.2, task priority metric of 0.9, etc.), the requesting timestamp at which the computational task is requested. In some embodiments, the task metadata may also include the task execution status indicating the current execution status of the computational task (e.g., task execution status of "preprocessing," task execution status of "execution completed" etc.), the task execution time indicating the amount of time during which the computational task has been executed (e.g., 00:03:30), the remaining execution time indicating the amount of additional time needed to complete the computational task, the task progress metric indicating the task completion percentage (e.g., 87%) and/or the task execution speed (e.g., 11%/s) of the computational task, etc.

In some embodiments, the task metadata of the computational task may include a performance requirement of the computational task. The performance requirement may describe the requirement of performance that the execution of the computational task needs to satisfy. For example, the performance requirement of the computational task may specify the task duration indicating the execution time threshold of the computational task (e.g., 00:05:30), the target delivery timestamp by which the requesting entity needs to receive the task output data of the computational task (e.g., Nov. 5, 2018, 14:00:00), the communication latency threshold associated with the task input data of the computational task (e.g., 2 s), the communication latency threshold associated with the task output data of the computational task (e.g., 4 s), etc. Other types of performance requirement are also possible and contemplated.

In some embodiments, the task metadata of the computational task may include a processing resource requirement describing the requirement of various resource components to perform the execution of the computational task. In some embodiments, the processing resource requirement may include a computation profile and a communication profile. In some embodiments, the computation profile of the computational task may specify the amount of computing resource, the amount of data storage resource, the amount of memory resource, the amount of sensing resource, etc. required to perform the execution of the computational task.

In some embodiments, as the amount of communication resource required to perform the execution of the computational task may depend on the geographic location of the computing entity to which the computational task is assigned, the communication profile of the computational task may specify various factors that can be used to compute such amount of communication resource (e.g., the required communication bandwidth). In some embodiments, the communication profile of the computational task may specify the input data size of the task input data, the output data size of the task output data, the frequency of request for the task input data, the frequency of request for the task output data, etc. associated with the computational task. In some embodiments, the communication profile may also specify the geolocation associated with the task input data of the computational task and the geolocation associated with the task output data of the computational task. In some embodiments, the geolocation associated with the task input data may be the geographic location of the computing entities from which the task input data of the computational task is received, and the geolocation associated with the task output data may be the geographic location of the computing entities to which the task output data of the computational task is transmitted.

In some embodiments, the task metadata of the computational task may include a completion processing resource requirement of the computational task. The completion processing resource requirement may describe the requirement of various resource components to complete the execution of the computational task at a checkpoint timestamp during such execution. In some embodiments, the data components specified in the completion processing resource requirement of the computational task may be similar to the data components specified in the processing resource requirement of the computational task, and thus not repeated again for brevity.

In some embodiments, the task data of the computational task may include task description describing the computational task in an executable manner. In some embodiments, the task description may include program source code to be executed to perform the computational task, the task input data, the task executing data, etc. of the computational task. In some embodiments, the task input data may be included in the task description of the computational task (e.g., content items to be stored, etc.), retrieved from or generated by the computing entity hosting the computational task, and/or received from other entities of the system 100 as the computational task is executed, etc. In the above example, as the computational task of generating dynamic map of the road segment is executed by the TVVS 109, the task input data of the computational task may include both the road scene images received from the first vehicle platforms 103 located on the road segment and the road scene images generated by the participant vehicles of the TVVS 109. In some embodiments, the task executing data may be temporary data generated during the execution of the computational task. For example, the task executing data may include the task variables (e.g., Histogram of Oriented Gradients (HOG) feature vectors, etc.), the virtual machine image describing the current execution state of the computational task, etc. In some embodiments, in addition to the task metadata and the task description, the task data may include any type of data that is necessary to execute or to continue the execution of the computational task.

In some embodiments, the virtual data store 128 may be part of a data storage system (e.g., a standard data or database management system) for storing and providing access to data. Other types of data stored in the virtual data store 128 are also possible and contemplated.

The local server 107 includes a hardware and/or virtual server that includes a processor, a memory, and network communication capabilities (e.g., a communication unit). In some embodiments, the local server 107 may manage and/or perform the execution of computational tasks for the computing entities of the system 100. In some embodiments, the local server 107 may have a coverage area 192 including a road segment on which the vehicle platforms 103 and the participant vehicles of multiple TVVSs 109 travel. These vehicle platforms 103 and/or these participant vehicles of the TVVSs 109 may have their computational tasks being managed and/or executed by the local server 107. In some embodiments, the local server 107 may also manage and/or execute the computational tasks for other local servers 107 and the centralized servers 101. In some embodiments, the local server 107 may be implemented as a computing infrastructure located on the roadside of the road segment (e.g., a roadside unit). In some embodiments, the local server 107 may be may be implemented as a stationary computing server located within a predefined distance from the corresponding coverage area 192 (e.g., 30 km).

As depicted in FIG. 1B, the local server 107 may be communicatively coupled to the network 105 to send and receive data to and from other components of the system 100 via the network 105. For example, the local server 107 may send and receive data to and from the centralized servers 101, other local servers 107, the TVVSs 109, the vehicle platforms 103, etc. via the network 105 through the network connections (e.g., the signal line 162). As discussed above, the local server 107 may be implemented as a computing infrastructure located on the roadside of the road segment on which the vehicle platforms 103 and the participant vehicles of the TVVSs 109 travel. Therefore, in some embodiments, the local server 107 may send and receive data to and from these vehicle platforms 103 via the V2I connections 168. The local server 107 may also send and receive data to and from these TVVSs 109 via the V2I connections 160. The implementation of the V2I connections 168 and the V2V connections 160 for data transmission between the local server 107 and the vehicle platforms 103 and/or the TVVSs 109 is particularly advantageous, because it can significantly reduce the transmission latency and monetary cost for sending and receiving data to and from these entities. In some embodiments, as depicted in FIG. 1A, the local server 107 may include an instance of the task managing application 120b and a data store 126 that store various types of data for access and/or retrieval by this application.

In some embodiments, the data store 126 includes a non-transitory storage medium that stores the unique local server ID of the local server 107, the local server geolocation indicating geographic location (e.g., GPS coordinates) of the local server 107, the coverage data describing the coverage area 192 of the local server 107 (e.g., coverage geolocation, coverage boundary, etc.). In some embodiments, the data store 126 may also store resource data describing the resource pool of the local server 107. In some embodiments, the resource data may include multiple resource availability entries describing the available processing resources of the local server 107 at multiple timestamps. In some embodiments, each resource availability entry may indicate the amount of available computing resource (e.g., number of available CPU cycles), the amount of available data storage resource (e.g., capacity of free storage space), the amount of available memory resource (e.g., capacity of free memory space), the amount of available communication resource (e.g., unoccupied communication bandwidth), etc. of the local server 107 at a particular timestamp. In some embodiments, the data store 126 may also store a task execution list of the local server 107. The task execution list may include one or more computational task entries describing one or more computational tasks assigned to the local server 107 to perform the task execution. As discussed elsewhere herein, each computational task entry may include the task metadata specifying various properties of the computational task and the task description describing the computational task in an executable manner.

In some embodiments, the data store 126 may store vehicle information describing one or more vehicle platforms 103 located within the coverage area 192 of the local server 107. These vehicle platforms 103 may be individual vehicle platforms 103 that are not currently participating in temporal vehicular virtual servers (TVVS) 109. In some embodiments, the vehicle information may include multiple vehicle entries, each vehicle entry may include the vehicle ID, the vehicle movement data, the resource availability data, etc. of an individual vehicle platform 103 located within the coverage area 192. As discussed elsewhere herein, the vehicle movement data of the vehicle platform 103 may indicate the vehicle speed, the vehicle geolocation (e.g., GPS coordinates), the vehicle route, etc. of the vehicle platform 103. The resource availability data of the vehicle platform 103 may indicate the amount of available computing resource, the amount of available data storage resource, the amount of available memory resource, the amount of available communication resource, etc. of the vehicle platform 103 at multiple timestamps. In some embodiments, the data store 126 may also store vehicle information describing the vehicle platforms 103 located within the coverage areas 192 of other local servers 107.

In some embodiments, the data store 126 may store centralized server information describing one or more centralized servers 101. In some embodiments, the centralized server information may include multiple centralized server entry, each centralized server entry may include the unique centralized server ID, the centralized server geolocation, the resource availability data, etc. of a centralized server 101. The resource availability data of the centralized server 101 may indicate the amount of available computing resource, the amount of available data storage resource, the amount of available memory resource, the amount of available communication resource, etc. of the centralized server 101 at multiple timestamps. In some embodiments, the data store 126 may also store local server information describing other local server(s) 107. In some embodiments, the local server information may include multiple local server entries, each local server entry may include the unique local server ID, the local server geolocation, the coverage data, the resource availability data, etc. of another local server 107. The resource availability data of the another local server 107 may indicate the amount of available computing resource, the amount of available data storage resource, the amount of available memory resource, the amount of available communication resource, etc. of the another local server 107 at multiple timestamps.

In some embodiments, the data store 126 may store temporal vehicular virtual server information (TVVS information) describing the TVVS(s) and the candidate TVVS(s) located within the coverage area 192 of the local server 107. In particular, the local server 107 may manage a set of TVVSs including one or more existing TVVSs 109 and a set of candidate TVVSs including one or more candidate TVVSs located on a road segment within its coverage area 192. In some embodiments, for each TVVS 109 in the set of TVVSs, the TVVS information may include a TVVS entry indicating the unique TVVS ID, the TVVS geolocation, the vehicle cluster data, the resource availability data, etc. of the TVVS 109. In some embodiments, the TVVS geolocation may indicate the geographic location of the TVVS 109 (e.g., the TVVS geolocation of the TVVS 109 may be determined as the vehicle geolocation of the leading vehicle platform 103 that coordinates the establishment of the TVVS 109). In some embodiments, the vehicle cluster data may describe the vehicle cluster that forms the TVVS 109. As discussed elsewhere herein, the vehicle cluster data of the TVVS 109 may include the vehicle ID, the vehicle movement data, the participation start time, the participation end time, etc. of each participant vehicle. In some embodiments, the resource availability data of the TVVS 109 may describe the available processing resources of the TVVS 109 at multiple timestamps. For each particular timestamp, the resource availability data may indicate the quantities of available processing resources contributed by each participant vehicle of the TVVS 109, and the total quantities of available processing resources in the resource pool of the TVVS 109 at the particular timestamp.

In some embodiments, the candidate TVVS may comprise the candidate participant vehicles that can potentially connect to one another to form a new temporal vehicular virtual servers (TVVS) 109. The candidate participant vehicles may be the individual vehicle platforms 103 and/or the participant vehicles of the existing TVVSs 109 located within the coverage area 192 of the local server 107. In some embodiments, for each candidate TVVS in the set of candidate TVVSs, the TVVS information may include a candidate TVVS entry indicating the candidate TVVS geolocation, the candidate vehicle cluster data, the resource availability data, etc. of the candidate TVVS. In some embodiments, the candidate TVVS geolocation may indicate the geographic location of the candidate TVVS (e.g., the candidate TVVS geolocation may be determined as the vehicle geolocation of any candidate participant vehicle included in the candidate TVVS). In some embodiments, the candidate vehicle cluster data may describe the candidate vehicle cluster that potentially forms the new TVVS 109 corresponding to the candidate TVVS. The candidate vehicle cluster data of the candidate TVVS may include the vehicle ID, the vehicle movement data, etc. of each candidate participant vehicle. In some embodiments, the resource availability data of the candidate TVVS may describe the available processing resources of the candidate TVVS. In particular, the resource availability data may indicate the quantities of available processing resources potentially contributed by each candidate participant vehicle of the candidate TVVS, and the total quantities of available processing resources associated with the candidate TVVS if the candidate TVVS is actually established. In some embodiments, the data store 126 may also store TVVS information describing the TVVS(s) and the candidate TVVS(s) located within the coverage areas 192 of other local servers 107.

In some embodiments, the data store 126 may store a task assignment list describing multiple computational tasks currently assigned to various computing entities of the system 100 (e.g., the centralized servers 101, the local servers 107, the TVVSs 109, the vehicle platforms 103, etc.). In some embodiments, the task assignment list may include multiple task assignment entries corresponding to multiple computational tasks, each task assignment entry may include the unique task ID of the computational task, the unique entity ID of the computing entity to which the computational task is assigned (e.g., centralized server ID, local server ID, TVVS ID, vehicle ID, etc.), the task performance metrics of the computational tasks, etc. In some embodiments, the task assignment entry may also include other types of task metadata associated with the computational task.

In some embodiments, the data store 126 may be part of a data storage system (e.g., a standard data or database management system) for storing and providing access to data. Other types of data stored in the data store 126 are also possible and contemplated.

The centralized server 101 includes a hardware and/or virtual server that includes a processor, a memory, and network communication capabilities (e.g., a communication unit). In some embodiments, the centralized server 101 may be a stationary computing server located remotely from the roads on which the vehicle platforms 103 and the participant vehicles of multiple TVVSs 109 travel. For example, the centralized server 101 may be a cloud server residing in a data center. The centralized server 101 may be communicatively coupled to the network 105, as reflected by signal line 158. In some embodiments, the centralized server 101 may send and receive data to and from other entities of the system 100, e.g., the local servers 107, the temporal vehicular virtual servers (TVVS) 109, the vehicle platforms 103, etc. via the network 105. In some embodiments, the centralized server 101 may be provided with larger amount of processing resources as compared to the local servers 107. For example, the centralized server 101 may have massive processing capacity, data storage space, memory space, reliable network connections with large communication bandwidth, etc. As depicted in FIG. 1A, the centralized server 101 may include an instance of the task managing application 120a and a data store 124 that stores various types of data for access and/or retrieval by this application.

In some embodiments, the data store 124 includes a non-transitory storage medium that stores the unique centralized server ID of the centralized server 101 and the centralized server geolocation indicating geographic location (e.g., GPS coordinates) of the centralized server 101. In some embodiments, the data store 124 may also store the resource data describing the resource pool of the centralized server 101 and the task execution list describing one or more computational tasks assigned to the centralized server 101 to perform the task execution. In some embodiments, the data store 124 may also store the centralized server information describing other centralized servers 101, the local server information describing multiple local servers 107, and the vehicle information describing multiple vehicle platforms 103 located within the coverage areas 192 of these multiple local servers 107.

In some embodiments, the data store 124 may store the TVVS information describing the TVVS(s) and the candidate TVVS(s) located within the coverage areas 192 of these multiple local servers 107. In some embodiments, the data store 124 may also store the task assignment list describing multiple computational tasks currently executed on various computing entities of the system 100 (e.g., the centralized servers 101, the local servers 107, the TVVSs 109, the vehicle platforms 103, etc.). In some embodiments, the data components of the data stored in the data store 124 of the centralized servers 101 may be similar to the data components of the data stored in the data store 126 of the local server 107, and thus not repeated again for brevity. In some embodiments, the data store 124 may be part of a data storage system (e.g., a standard data or database management system) for storing and providing access to data. Other types of data stored in the data store 124 are also possible and contemplated.

Other variations and/or combinations are also possible and contemplated. It should be understood that the system 100 illustrated in FIGS. 1A and 1B is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2A:
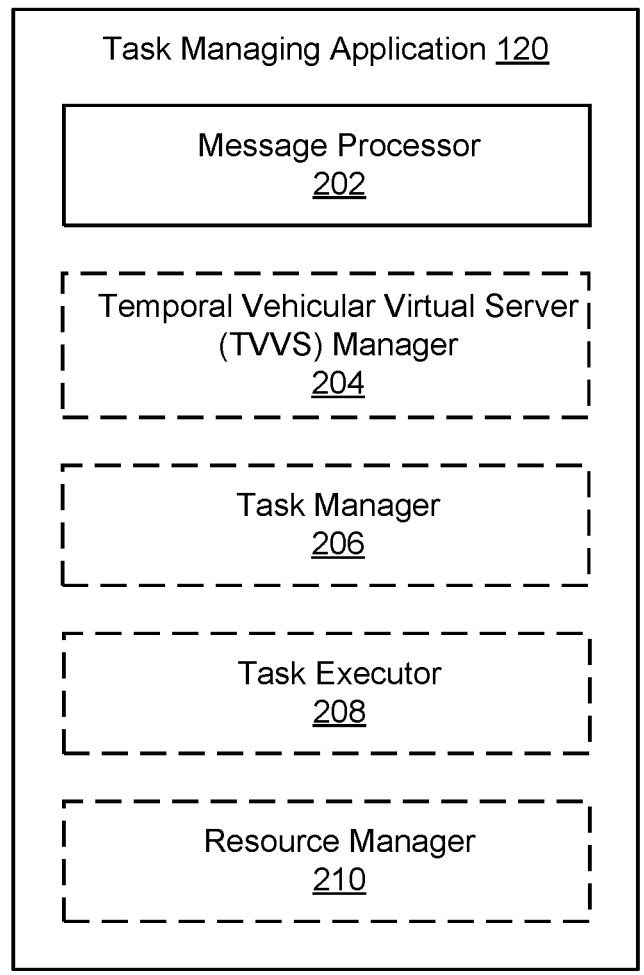
FIG. 2A is a block diagram of an example task managing application.

FIG. 2A is a block diagram of an example task managing application 120. As depicted, the task managing application 120 may include a message processor 202, a temporal vehicular virtual server (TVVS) manager 204, a task manager 206, a task executor 208, and a resource manager 210, although it should be understood that the task managing application 120 may include additional components such as, but not limited to, a configuration engine, a training engine, an encryption/decryption engine, etc., and/or these various components may be combined into a single engine or divided into additional engines.

The message processor 202, the TVVS manager 204, the task manager 206, the task executor 208, and the resource manager 210 may be implemented as software, hardware, or a combination of the foregoing. The message processor 202, the TVVS manager 204, the task manager 206, the task executor 208, and the resource manager 210 may be communicatively coupled by bus (e.g., the bus 154) and/or processor (e.g., the processor 115) to one another and/or to the other components of the computing device of the entity (e.g., the computing device 152 of the vehicle platform 103). In some embodiments, one or more of the components 120, 202, 204, 206, 208 and/or 210 are sets of instructions executable by the processor (e.g., the processor 115) to provide their functionality. In further embodiments, one or more of the components 120, 202, 204, 206, 208 and/or 210 are storable in the memory (e.g., the memory 117) and are accessible and executable by the processor (e.g., the processor 115) to provide their functionality. In any of the foregoing embodiments, these components 120, 202, 204, 206, 208 and/or 210 may be adapted for cooperation and communication with the processor (e.g., the processor 115) and other components of the computing device of the entity (e.g., the computing device 152 of the vehicle platform 103).

Figure 2B:
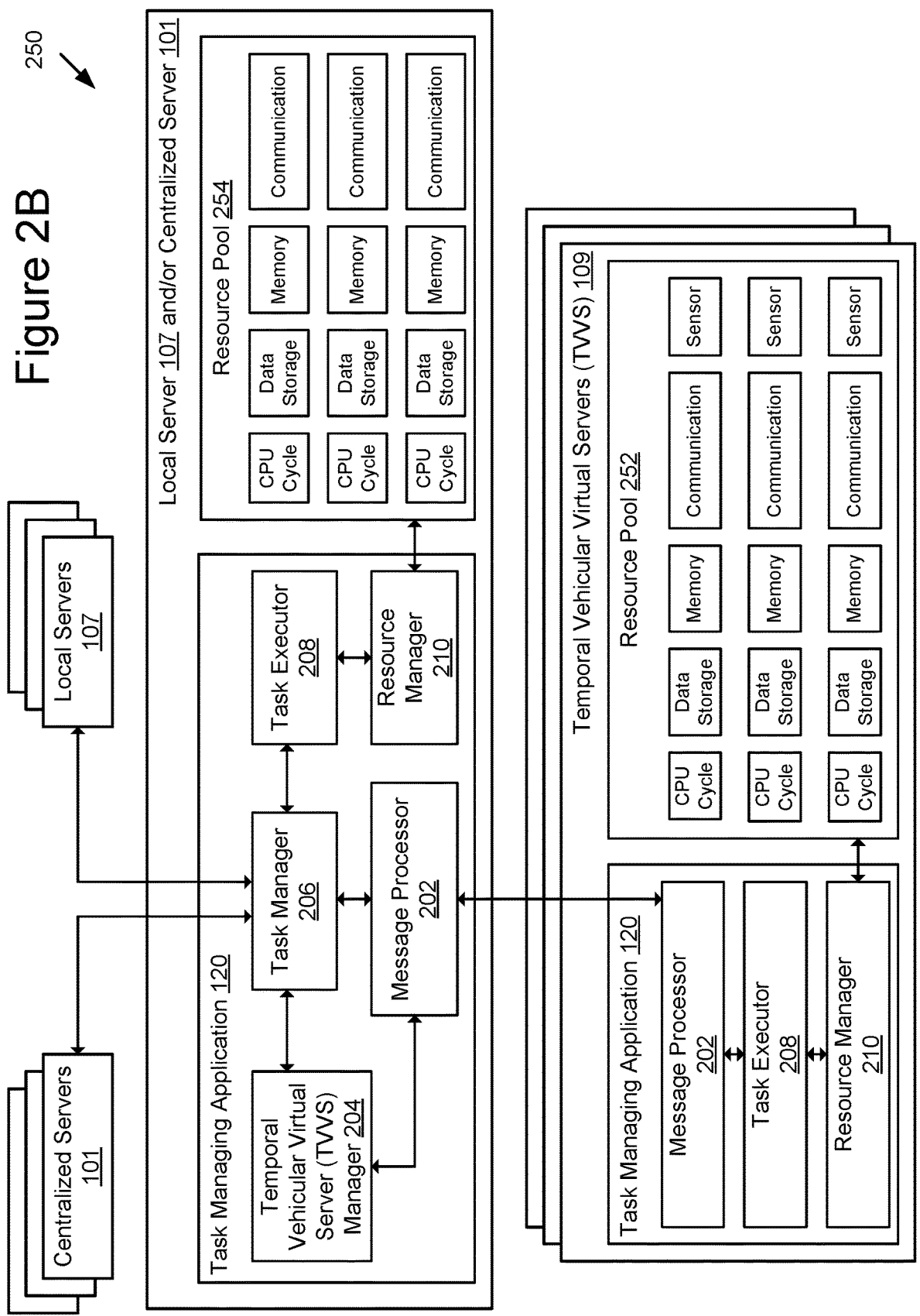
FIG. 2B is a structure diagram of an example task managing application implemented in various computing entities.

FIG. 2B is a structure diagram 250 of the task managing application 120 implemented in various computing entities of the system 100 (e.g., temporal vehicular virtual server (TVVS) 109, the local servers 107, and/or the centralized servers 101, etc.). As depicted in FIG. 2B, if the task managing application 120 is implemented in the TVVS 109, the task managing application 120 may be optionally configured to enable the message processor 202, the task executor 208, the resource manager 210, and disable other components of the task managing application 120. As illustrated, the TVVS 109 may include a resource pool 252 managed by the resource manager 210. The processing resources in the resource pool 252 may include various resource components, e.g., computing resource (e.g., number of CPU cycles), data storage resource, memory resource, communication resource, sensing resource (e.g., sensor data captured by the sensors 113 of the participant vehicles included in the TVVS 109), etc. As discussed elsewhere herein, these resource components may be in the form of virtual resource units that can be allocated to various computational tasks to perform the task execution.

As depicted in FIG. 2B, if the task managing application 120 is implemented in the local server 107 and/or in the centralized server 101, the task managing application 120 may be optionally configured to enable the message processor 202, the TVVS manager 204, the task manager 206, the task executor 208, and the resource manager 210. As illustrated, the local server 107 and/or the centralized server 101 may include a resource pool 254 managed by the resource manager 210. The processing resources in the resource pool 254 may include computing resource (e.g., number of CPU cycles), data storage resource, memory resource, communication resource, etc. In some embodiments, the resource pool 254 of the local server 107 and/or the centralized server 101 may not include sensing resource, because these computing servers may not have the sensing capabilities provided by sensor devices. The task managing application 120, and its components 202, 204, 206, 208, and 210 are described in further detail below with reference to at least FIGS. 3-9.

As discussed elsewhere herein, the task managing application 120 is computer logic executable to manage computational tasks in vehicle context. In some embodiments, the task managing application 120 may receive a computational task and determine a processing resource requirement of the computational task. The task managing application 120 may determine a computing entity to execute the computational task, the computing entity executing the computational task may be a temporal vehicular virtual server (TVVS) 109 comprising participant vehicles proximately located relative to one another on a road segment. In particular, the task managing application 120 may determine available processing resources of the TVVS 109 at a first timestamp. The task managing application 120 may determine vehicle movement data of the participant vehicles included in the TVVS 109, and estimate available processing resources of the TVVS 109 at a second timestamp based on the vehicle movement data of these participant vehicles. The task managing application 120 may determine to execute the computational task on the TVVS 109 based on the processing resource requirement of the computational task, the available processing resources of the TVVS 109 at the first timestamp, and the estimated available processing resources of the TVVS 109 at the second timestamp. Responsive to determining to execute the computational task on the TVVS 109, the task managing application 120 may assign the computational task to the TVVS 109 to perform the execution of the computational task.

FIG. 3 is a flowchart of an example method 300 for assigning computational tasks in vehicle context. In block 302, the temporal vehicular virtual servers (TVVS) 109 may monitor their available processing resources. In particular, in each TVVS 109, the resource manager 210 may monitor various resource components in the resource pool 252 of the TVVS 109, and frequently determine the quantities of these resource components available for use in the resource pool 252 at multiple timestamps (e.g., every 2 s, etc.). In some embodiments, for a particular timestamp, the resource manager 210 may determine the quantities of available processing resources contributed by each participant vehicle of the TVVS 109 at the particular timestamp, and the total quantities of available processing resources in the resource pool 252 of the TVVS 109 at the particular timestamp. In some embodiments, the resource manager 210 may generate a resource availability entry indicating these quantities of available processing resources, and store the resource availability entry associated with the particular timestamp in the virtual data store 128.

As an example, at a first timestamp $t=t_1=14:00:00$, the resource manager 210 may retrieve the vehicle cluster data of a first TVVS 109 from its virtual data store 128 and determine that the first TVVS 109 includes a first participant vehicle 103a, a second participant vehicle 103b, and a third participant vehicle 103c at the first timestamp $t=t_1$. Thus, at the first timestamp $t=t_1$, these participant vehicles may contribute their available processing resources to the resource pool 252 of the first TVVS 109.

In this example, the resource manager 210 may determine that the available processing resources contributed by the first participant vehicle 103a includes the computing resource of 1GHz (e.g., $10^9$ CPU cycles), the data storage resource of 1.5 GB, the memory resource of 500 MB, the communication resource of 2 Mbps, and the sensing resource including 4 road scene images captured by the image sensors 113 of the first participant vehicle 103a at the first timestamp $t=t_1$. The resource manager 210 may determine that the available processing resources contributed by the second participant vehicle 103b includes the computing resource of 1.5 GHz (e.g., $1.5*10^9$ CPU cycles), the data storage resource of 2 GB, the memory resource of 750 MB, the communication resource of 1.5 Mbps, and the sensing resource including 4 road scene images captured by the image sensors 113 of the second participant vehicle 103b at the first timestamp $t=t_1$. The resource manager 210 may also determine that the available processing resources contributed by the third participant vehicle 103c includes the computing resource of 1 GHz, the data storage resource of 2.5 GB, the memory resource of 250 MB, the communication resource of 1.5 Mbps, and the sensing resource including 2 road scene images captured by the image sensors 113 of the third participant vehicle 103c at the first timestamp $t=t_1$.

Accordingly, in this example, the resource manager 210 may determine that the total available processing resources in the resource pool 252 of the first TVVS 109 at the first timestamp $t=t_1$ include the available computing resource of 3.5 GHz, the available data storage resource of 6 GB, the available memory resource of 1.5 GB, the available communication resource of 5 Mbps, and the available sensing resource including 10 road scene images captured at the first timestamp $t=t_1$ as collectively contributed by the first participant vehicle 103a, the second participant vehicle 103b, and the third participant vehicle 103c. The resource manager 210 may generate the resource availability entry indicating the available processing resources contributed by the first participant vehicle 103a, the available processing resources contributed by the second participant vehicle 103b, the available processing resources contributed by the third participant vehicle 103c, and the total available processing resources in the resource pool 252 of the first TVVS 109. The resource manager 210 may then store the resource availability entry associated with the first timestamp $t=t_1=14:00:00$ in the virtual data store 128 as the resource availability data of the first TVVS 109 at the first timestamp $t=t_1$.

In block 304, the TVVS 109 may transmit a resource availability status to a local server 107 and/or a centralized server 101 that manages the computational tasks for the computing entities of the system 100. To simplify the description in this present disclosure, assuming that the management of the computational tasks for the computing entities of the system 100 is performed by a local server 107, such local server 107 may be referred to herein as the local management server 107. It should be understood that the management of computational tasks may be performed by other computing entities (e.g., the centralized servers 101, the TVVSs 109, the vehicle platforms 103, etc.). In some embodiments, in the TVVS 109, the resource manager 210 may generate the resource availability status including the particular timestamp and the resource availability data of the TVVS 109 at the particular timestamp. The message processor 202 may then transmit the resource availability status to the local management server 107.

In block 306, the local management server 107 may process the resource availability status. In particular, in the local management server 107, the message processor 202 may analyze the resource availability status to extract the particular timestamp and the resource availability data of the TVVS 109 at the particular timestamp. The message processor 202 may then store the resource availability data of the TVVS 109 together with the particular timestamp in the TVVS entry associated with the TVVS 109 in the data store 126. As discussed above, the resource availability data of the TVVS 109 may indicate the quantities of available processing resources contributed by each participant vehicle of the TVVS 109 at the particular timestamp, and the total quantities of available processing resources in the resource pool 252 of the TVVS 109 at the particular timestamp. In some embodiments, other computing entities of the system 100 (e.g., the individual vehicle platforms 103, other local servers 107, the centralized servers 101, etc.) may also monitor their available processing resources and transmit the resource availability status to the local management server 107 in a similar manner. As a result, the local management server 107 can keep track of the quantities of available processing resources on different computing entities of the system 100 at various timestamps.

In block 308, the local management server 107 may receive a computational task from a requesting entity. In some embodiments, any entity of the system 100 may request a computational task to be executed. As an example, the centralized server 101 may request a first computational task that includes receiving road scene images captured by first vehicle platforms 103 located on a road segment, processing the road scene images to generate a dynamic map of the road segment, and transmitting the dynamic map of the road segment to second vehicle platforms 103 located in a proximate geographic region (e.g., the geographic region within a radius of 2 miles from the road segment). In some embodiments, the local management server 107 may determine a processing resource requirement of the computational task. In particular, in the local management server 107, the task executor 208 may analyze the computational task to determine the task metadata and the task description of the computational task. As discussed elsewhere herein, the task metadata may specify various properties of the computational task and the task description may describe the computational task in an executable manner. The task metadata may include the processing resource requirement of the computational task.

In the above example, for the task metadata of the first computational task, the task executor 208 may assign a unique task ID for the first computational task, and classify the first computational task into the task category of "map generation tasks." The task executor 208 may specify the task priority metric of the first computational task to be 0.8, the task execution status of the first computational task to be "preprocessing," and the task completion percentage of the first computational task to be 0%. The task executor 208 may also determine the performance requirement of the first computational task. In this example, the task executor 208 may estimate the task duration of the first computational task (e.g., $\Delta_{t\_task\_duration}$) to be 00:02:30, the target delivery timestamp of the first computational task to be "Nov. 5, 2018, 14:02:45," the communication latency threshold associated with the task input data to be 2 s, the communication latency threshold associated with the task output data to be 4 s, etc.

The task executor 208 may also determine the processing resource requirement including the computation profile and the communication profile of the first computational task. As discussed elsewhere herein, the computation profile of the computational task may specify the amount of computing resource, the amount of data storage resource, the amount of memory resource, the amount of sensing resource, etc. required to perform the execution of the computational task. In this example, the computation profile of the first computational task may indicate that the execution of the first computational task requires the computing resource of 0.3 GHz, the data storage resource of 450 MB, the memory resource of 300 MB, and the sensing resource of the computing entity hosting the first computational task (if applicable). In this example, the task executor 208 may determine that the task input data of the first computational task is associated with the road segment (e.g., road scene images). Thus, if the first computational task is executed on a TVVS 109, the sensing resource may include the road scene images captured by the participant vehicles of the TVVS 109 using their image sensors 113.

As discussed elsewhere herein, the communication profile of the computational task may specify various factors that can be used to compute the amount of communication resource required to perform the execution of the computational task. In this example, the task input data of the first computational task may be the road scene images received from the first vehicle platforms 103 located on the road segment, and the task output data of the first computational task may be the dynamic map of the road segment transmitted to the second vehicle platforms 103 located in the proximate geographic region (e.g., the geographic region within 2 miles from the road segment). Thus, the communication profile of the first computational task may specify the input data size of the task input data to be the estimated data size of the captured road scene image (e.g., 50 kB), and specify the output data size of the task output data to be the estimated data size of the dynamic map of the road segment (e.g., 100 MB). In this example, the communication profile of the first computational task may specify the frequency of request for the task input data to be the frequency at which the road scene images are received from the first vehicle platforms 103 (e.g., 3 s), and specify the frequency of request for the task output data to be the frequency at which the dynamic map of the road segment is transmitted to the second vehicle platforms 103 (e.g., 60 s). The communication profile of the first computational task may also specify the geolocation associated with the task input data to be the geographic location of the road segment on which the first vehicle platforms 103 are located, and specify the geolocation associated with the task output data to be the geographic location of the proximate geographic region in which the second vehicle platforms 103 are located.

In this example, for the task description of the first computational task, the task executor 208 may retrieve the program source code to be executed to perform the first computational task from the data store 126, and specify the task input data to be the road scene images received from the first vehicle platforms 103 located on the road segment. If the first computational task is assigned to a TVVS 109, the task input data may also include the road scene images captured by the participant vehicles of the TVVS 109 using their image sensors 113 as discussed elsewhere herein.

In some embodiments, other computing entities of the system 100 may receive the computational task from the requesting entity and inform the local management server 107 of the computational task. For example, in block 310, a temporal vehicular virtual server (TVVS) 109 may receive a computational task from a requesting entity. As an example, the TVVS 109 may receive a computational task from a vehicle platform 103 located proximate to the TVVS 109 on a road segment. In some embodiments, in the TVVS 109, the task executor 208 may analyze the computational task to determine the task metadata and the task description of the computational task. In block 312, the TVVS 109 may transmit a task request notification to the local management server 107. In particular, in the TVVS 109, the task executor 208 may generate the task request notification indicating that the computational task is requested, and transmit the task request notification to the local management server 107. In some embodiments, the task request notification may include the task metadata specifying various properties of the computational task, and/or the task description describing the computational task in an executable manner as discussed above. In some embodiments, other computing entities of the system 100 (e.g., the individual vehicle platforms 103, other local servers 107, the centralized servers 101, etc.) may also receive computational tasks from the requesting entities and inform the local management server 107 of the computational tasks in a similar manner.

In block 314, the local management server 107 may process the task request notification. In particular, in the local management server 107, the message processor 202 may analyze the task request notification to extract the task metadata and/or the task description of the computational task. In block 316, the local management server 107 may determine the computing entity to execute the computational task. In some embodiments, the local management server 107 may assign the computational task to an individual vehicle platform 103 or a stationary computing server (e.g., the centralized server 101, the local management server 107 itself, another local server 107, etc.) to perform the task execution. In particular, in the local management server 107, the task manager 206 may retrieve the resource availability data of the individual vehicle platforms 103, the centralized servers 101, the local management server 107, and/or other local servers 107 from the data store 126. As discussed elsewhere herein, the resource availability data may describe the available processing resources of these computing entities. In some embodiments, the task manager 206 may determine the computing entity executing the computational task from these computing entities based on their available processing resources. For example, the computing entity executing the computational task may be the computing entity that has the available processing resources satisfying the processing resource requirement of the computational task indicated in the task metadata.

In some embodiments, the local management server 107 may assign the computational task to a temporal vehicular virtual server (TVVS) 109 to perform the task execution. Performing the execution of the computational task on the TVVS 109 is particularly advantageous because the TVVS 109 may be located within a small distance from the requesting entity (e.g., other vehicle platforms 103 travelling on the same road segment as the TVVS 109), and thus the communication latency for receiving the task input data and transmitting the task output data of the computational task can be significantly reduced. In addition, the TVVS 109 can send and receive data via V2V connections 164, V2V connections 170, and V2I connections 160, and thus the monetary cost caused by data transmission over the network 105 can be limited.

Figure 4:
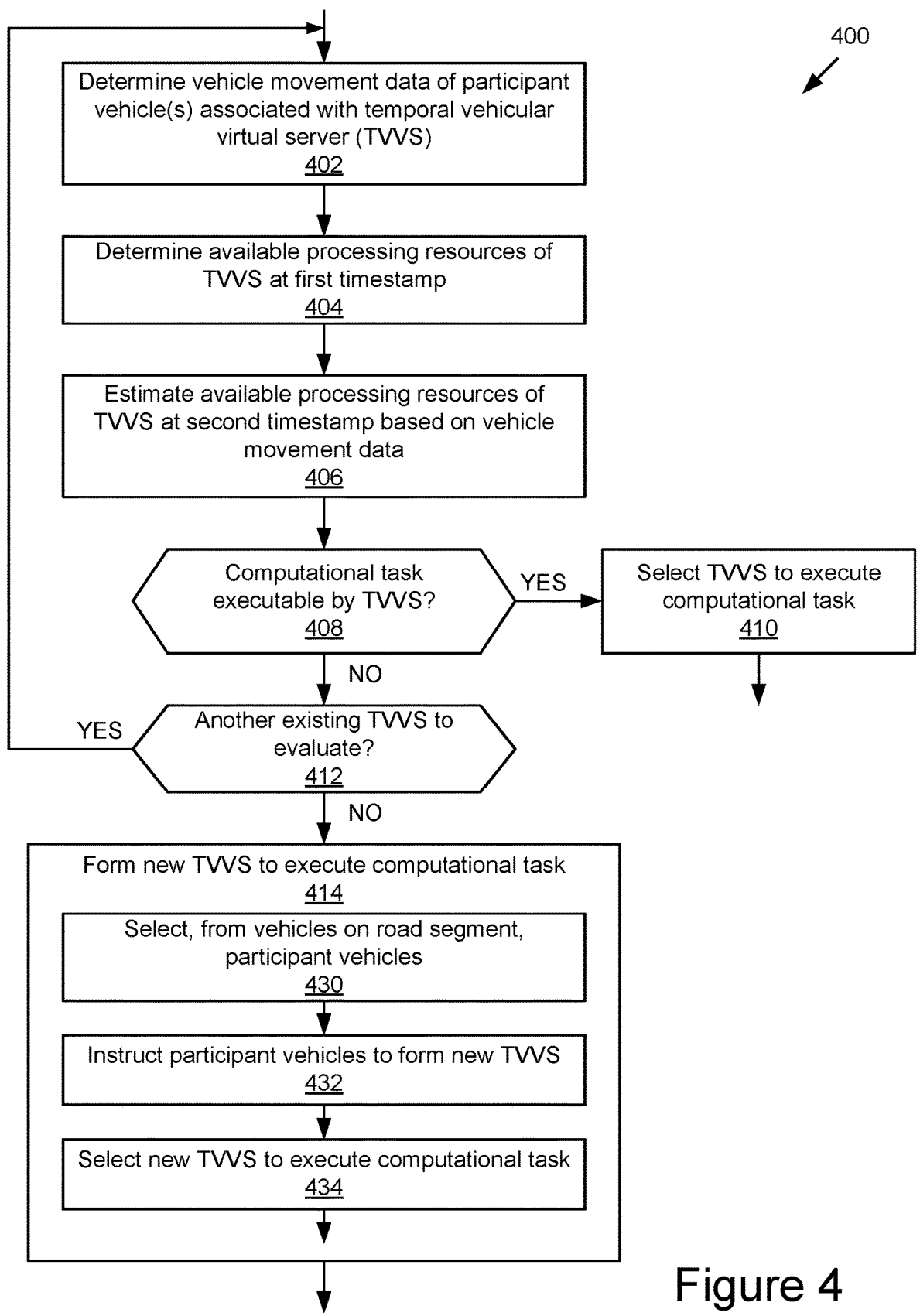
FIG. 4 is a flowchart of an example method for determining a temporal vehicular virtual server to perform an execution of a computational task.

FIG. 4 is a flowchart of an example method 400 for determining a TVVS 109 to perform the execution of the computational task. The method 400 may be performed by the TVVS manager 204 and the task manager 206 of the task managing application 120 included in the local management server 107. As discussed elsewhere herein, the local management server 107 may manage a set of TVVSs including one or more existing TVVSs 109 located on the road segment within its coverage area 192. To evaluate whether a first TVVS 109 included in the set of TVVSs can execute the computational task, in block 402, the TVVS manager 204 may determine the vehicle movement data of the first participant vehicles associated with the first TVVS 109.

In particular, the TVVS manager 204 may retrieve the vehicle cluster data of the first TVVS 109 from the data store 126, and thus determine that the first TVVS 109 comprises the first participant vehicles proximately located relative to one another on the road segment at a first timestamp. In some embodiments, the first timestamp may be the current timestamp $t_{current}$ at which the selection of the TVVS for the computational task is performed. In some embodiments, the TVVS manager 204 may receive the vehicle movement data of the first participant vehicles from the first participant vehicles of the first TVVS 109. In some embodiments, the first participant vehicles of the first TVVS 109 may frequently transmit their vehicle movement data to the local management server 107 (e.g., every 1 s) and thus, the TVVS manager 204 may retrieve the vehicle movement data of the first participant vehicles from the data store 126. As discussed elsewhere herein, the vehicle movement data of a first participant vehicle may include the vehicle speed, the vehicle geolocation (e.g., GPS coordinates), the vehicle route, etc. of the first participant vehicle.

In block 404, the task manager 206 may determine the available processing resources of the first TVVS at the first timestamp. As discussed elsewhere herein, the first TVVS 109 may frequently transmit the resource availability data specifying its available processing resources to the local management server 107 (e.g., every 1 s) and thus, the task manager 206 may retrieve the resource availability data of the first TVVS 109 at the first timestamp from the data store 126. The resource availability data may indicate the quantities of available processing resources contributed by each first participant vehicle of the first TVVS 109 at the first timestamp, and the total quantities of available processing resources in the resource pool 252 of the first TVVS 109 at the first timestamp.

In block 406, the task manager 206 may estimate the available processing resources of the first TVVS at a second timestamp subsequent to the first timestamp. In some embodiments, the second timestamp may be the target completion timestamp by which the computational task needs to be completed, and may be determined based on the first timestamp and the task duration of the computational task (e.g., the time distance between the two timestamps may be the task duration). In some embodiments, the task manager 206 may estimate the available processing resources of the first TVVS at the second timestamp based on the vehicle movement data of the first participant vehicles included in the first TVVS 109. In particular, the TVVS manager 204 may evaluate the vehicle movement data of the first participant vehicles included in the first TVVS 109, and determine second participant vehicles proximately located relative to one another on the road segment at the second timestamp from the first participant vehicles. The first TVVS 109 may potentially comprise the second participant vehicles at the second timestamp, and thus these second participant vehicles may contribute their available processing resources to the resource pool 252 of the first TVVS 109 at the second timestamp. In some embodiments, the task manager 206 may aggregate the available processing resources of these second participant vehicles into the estimated available processing resources of the first TVVS at the second timestamp.

As discussed elsewhere herein, the vehicle movement data of a first participant vehicle may include the vehicle speed, the vehicle geolocation (e.g., GPS coordinates), the vehicle route, etc. of the first participant vehicle. In some embodiments, to determine the second participant vehicles from the first participant vehicles, the TVVS manager 204 may determine the first participant vehicles with compatible vehicle speed. In particular, the TVVS manager 204 may compute the speed differences between the vehicle speeds of the first participant vehicles, and determine the first participant vehicles that have the speed differences satisfies a predefined speed difference threshold (e.g., less than 0.5 m/s) to be the second participant vehicles. In some embodiments, the TVVS manager 204 may determine the vehicle route portion that each first participant vehicle may travel between the first timestamp and the second timestamp according to its vehicle route. The TVVS manager 204 may then determine the first participant vehicles that have overlapping vehicle route portions to be the second participant vehicles. In some embodiments, the TVVS manager 204 may compute the relative distances between the first participant vehicles using their vehicle geolocations and monitor such relative distances over time. The TVVS manager 204 may determine the first participant vehicles that have the relative distances to one another satisfy a predefined relative distance threshold during at least a predefined time period (e.g., less than 20 m in the last 3 s) to be the second participant vehicles.

In these embodiments, as the second participant vehicles have compatible vehicle speeds, overlapping vehicle route portions, and/or proximately located relative to one another in the recent past, these second participant vehicles may potentially still be located proximate to one another at the second timestamp. Other types of vehicle movement data may also be used to determine the second participant vehicles from the first participant vehicles. In some embodiments, the TVVS manager 204 may also evaluate the vehicle movement data of the individual vehicle platforms 103 located on the road segment to determine the second participant vehicles. As one or more individual vehicle platforms 103 may be proximately located relative to one or more first participant vehicles of the first TVVS 109 at the second timestamp, these individual vehicle platforms 103 may join the first TVVS 109 at the second timestamp and contribute their available processing resources to the resource pool 252 of the first TVVS 109 at the second timestamp.

Continuing the above example, the local management server 107 may evaluate the first TVVS 109 in the set of TVVSs located within its coverage area 192 to determine whether the first computational task can be executed by the first TVVS 109. In this example, the TVVS manager 204 may retrieve the vehicle cluster data of the first TVVS 109 from the data store 126, and thus determine that the first TVVS 109 comprises the first participant vehicle 103a, the second participant vehicle 103b, and the third participant vehicle 103c travelling on the freeway I-15 at the first timestamp $t=t_1=t_{current}=14:00:00$. In this example, the task manager 206 may retrieve the resource availability data of the first TVVS 109 at the first timestamp $t=t_1$ from the data store 126. The resource availability data may indicate that the total available processing resources in the resource pool 252 of the first TVVS 109 at the first timestamp $t=t_1$ include the available computing resource of 3.5 GHz, the available data storage resource of 6 GB, the available memory resource of 1.5 GB, the available communication resource of 5 Mbps, and the available sensing resource including 10 road scene images captured at the first timestamp $t=t_1$ as collectively contributed by the first participant vehicle 103a, the second participant vehicle 103b, and the third participant vehicle 103c.

In this example, the task manager 206 may determine the second timestamp $t=t_2$ using the task duration of the first computational task. For example, the task manager 206 may compute the second timestamp $t_2=t_1+\Delta t\_task\_duration=14:00:00+00:02:30=14:02:30$. In this example, the TVVS manager 204 may determine that at the second timestamp $t=t_2=14:02:30$, the first participant vehicle 103a and the second participant vehicle 103b may continue traveling on freeway I-15 at the vehicle speed of 30 m/s according to their vehicle movement data, while the third participant vehicle 103c may take a freeway exit 295 according to its vehicle route. Thus, the TVVS manager 204 may determine that the first TVVS 109 may likely include the first participant vehicle 103a, the second participant vehicle 103b, but not the third participant vehicle 103c at the second timestamp $t=t_2$. Accordingly, the task manager 206 may determine that the total available processing resources in the resource pool 252 of the first TVVS 109 at the second timestamp $t=t_2$ potentially include the available computing resource of 2.5 GHz, the available data storage resource of 3.5 GB, the available memory resource of 1.25 GB, the available communication resource of 3.5 Mbps, and the available sensing resource including 8 road scene images captured at the second timestamp $t=t_2$ as collectively contributed by the first participant vehicle 103a and the second participant vehicle 103b.

In block 408, the task manager 206 may determine whether the computational task is executable by the first TVVS 109. In some embodiments, the task manager 206 may determine whether to execute the computational task on the first TVVS 109 based on the processing resource requirement of the computational task, the available processing resources of the first TVVS 109 at the first timestamp, and the available processing resources of the first TVVS 109 at the second timestamp. As discussed above, the first timestamp may be the current timestamp at which the first TVVS 109 is evaluated, and the second timestamp may be the future timestamp with the time distance to the first timestamp equal to the task duration of the computational task. In some embodiments, the task manager 206 may determine that the available processing resources of the first TVVS 109 at the first timestamp satisfy the processing resource requirement of the computational task, and/or determine that the available processing resources of the first TVVS 109 at the second timestamp satisfy the processing resource requirement of the computational task. Therefore, the task manager 206 may determine that the first TVVS 109 potentially has enough processing resources to complete the execution of the computational task, and thus the computational task is executable by the first TVVS 109.

As discussed elsewhere herein, the processing resource requirement of the computational task may include the computation profile and the communication profile of the computational task. The computation profile of the computational task may specify the amount of computing resource, the amount of data storage resource, the amount of memory resource, the amount of sensing resource, etc. required to perform the execution of the computational task. In some embodiments, the task manager 206 may estimate the amount of communication resource required to perform the execution of the computational task using the communication profile. In some embodiments, such amount of required communication resource may be directly proportional to the distance from the TVVS geolocation of the first TVVS 109 to the geolocation associated with the task input data of the computational task, and/or the distance from the TVVS geolocation of the first TVVS 109 to the geolocation associated with the task output data of the computational task. In some embodiments, the amount of required communication resource may also be directly proportional to the input data size of the task input data, the output data size of the task output data, the frequency of request for the task input data, the frequency of request for the task output data, etc. associated with the computational task. In some embodiments, the task manager 206 may update the processing resource requirement of the computational task to include the estimated amount of required communication resource.

Continuing the above example, the computation profile of the first computational task may indicate that the execution of the first computational task requires the computing resource of 0.3 GHz, the data storage resource of 450 MB, the memory resource of 300 MB, and the sensing resource including road scene images captured by the computing entity hosting the first computational task (if applicable). In this example, the task manager 206 may evaluate the communication profile of the first computational task and estimate the amount of communication resource required to execute the first computational task to be 1 Mbps. The task manager 206 may compare the total available processing resources in the resource pool 252 of the first TVVS 109 at the first timestamp $t=t_1=14:00:00$ and at the second timestamp $t=t_2=14:02:30$ against the processing resource requirement of the first computational task. As the amounts of each resource component included in the resource pool 252 of the first TVVS 109 at the first timestamp $t=t_1=14:00:00$ and at the second timestamp $t=t_2=14:02:30$ are larger than the amount of the corresponding resource component required to perform the execution of the first computational task, the task manager 206 may determine that the first computational task is executable by the first TVVS 109.

If in block 408, the task manager 206 determines that the computational task is executable by the first TVVS 109, the method 400 proceeds to block 410. In block 410, the task manager 206 may select the first TVVS 109 to execute the computational task, the method 400 may end. If in block 408, the task manager 206 determines that the computational task is not executable by the first TVVS 109, the method 400 proceeds to block 412. In block 412, the task manager 206 may determine whether there is another existing TVVS 109 in the set of TVVSs to evaluate. If in block 412, the task manager 206 determines that the set of TVVSs includes another existing TVVS 109 (e.g., a second TVVS 109) to be evaluated, the method 400 proceeds to block 402 to evaluate whether the second TVVS 109 can execute the computational task. If in block 412, the task manager 206 determines that the set of TVVSs does not include another existing TVVS 109 to be evaluated, the method 400 proceeds to block 414. In block 414, the TVVS manager 204 and the task manager 206 may form a new TVVS 109 to execute the computational task. This implementation is particularly advantageous, because the new TVVS 109 can be dynamically established as the execution of the computational task requires and may be adapted to the processing resource requirement of the computational task.

Figure 5:
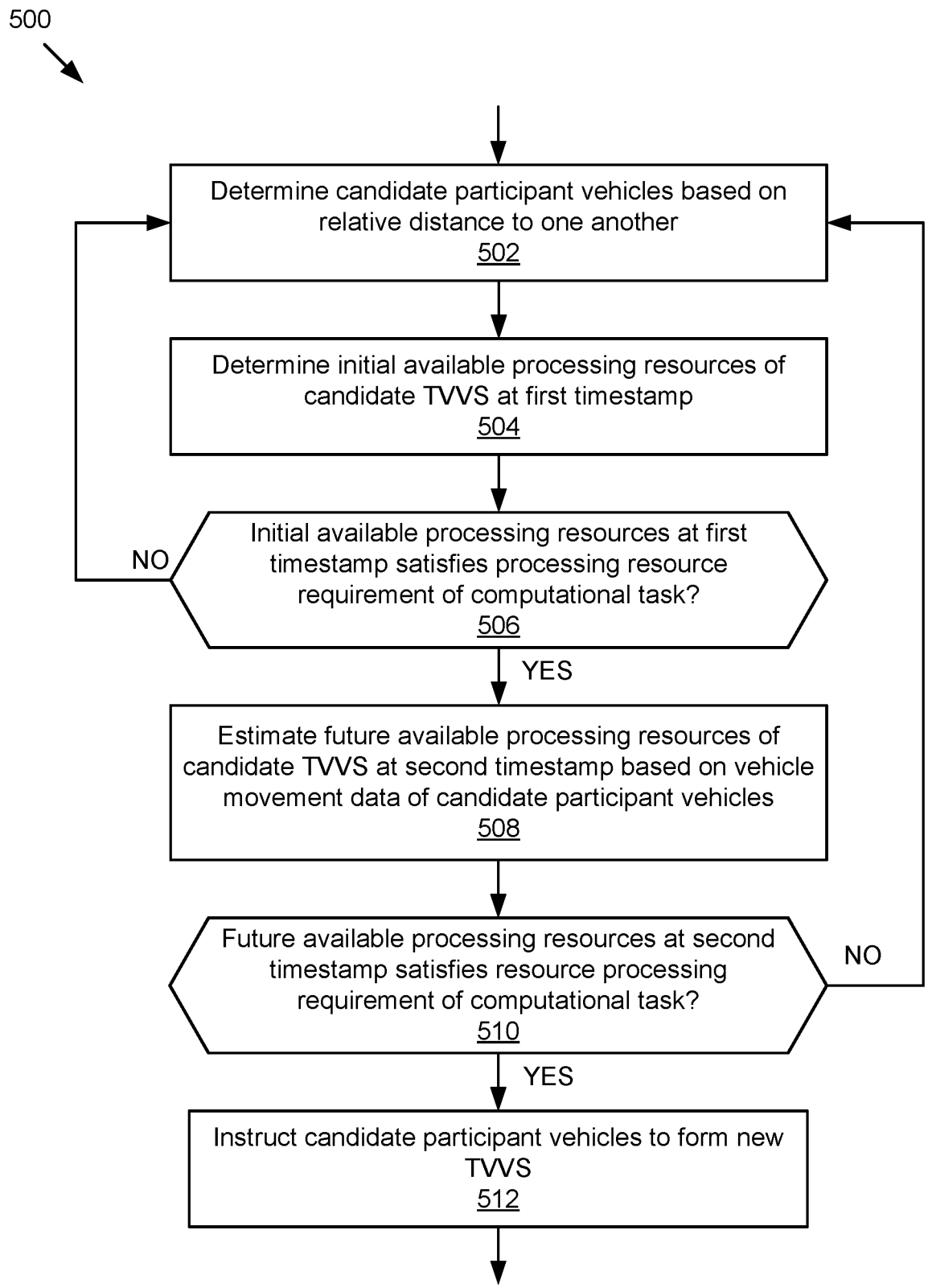
FIG. 5 is a flowchart of an example method for establishing a temporal vehicular virtual server to perform an execution of a computational task.

In some embodiments, to form the new TVVS 109 to execute the computational task, in block 430, the TVVS manager 204 may select participant vehicles for the new TVVS 109 from the vehicle platforms 103 located on the road segment. In block 432, the TVVS manager 204 may instruct these participant vehicles to form the new TVVS 109. FIG. 5 is a flowchart of an example method 500 for establishing a new TVVS 109 to perform the execution of the computational task. The method 500 may be performed by the TVVS manager 204 and the task manager 206 of the task managing application 120 included in the local management server 107. As discussed elsewhere herein, the local management server 107 may manage the participant vehicles of the existing TVVSs 109 and the individual vehicle platforms 103 located on the road segment within its coverage area 192. In block 502, the TVVS manager 204 may determine the candidate participant vehicles proximately located relative to one another on the road segment at a first timestamp from these vehicles. In some embodiments, the first timestamp may be the current timestamp $t_{current}$ at which the establishment of the new TVVS 109 is performed. In some embodiments, the TVVS manager 204 may determine a set of vehicles that have the relative distance to one another satisfying a predefined relative distance threshold (e.g., 150 m) to be the candidate participant vehicles.

In block 504, the task manager 206 may determine the initial available processing resources of a candidate TVVS at the first timestamp, the candidate TVVS may comprise the candidate participant vehicles. In some embodiments, the initial available processing resources of the candidate TVVS may include the quantities of available processing resources that the candidate participant vehicles may collectively contribute at the first timestamp. In block 506, the task manager 206 may determine whether the initial available processing resources of the candidate TVVS at the first timestamp satisfy the processing resource requirement of the computational task. If in block 506, the task manager 206 determines that the initial available processing resources of the candidate TVVS at the first timestamp do not satisfy the processing resource requirement of the computational task, the method 500 proceeds to block 502 to determine another set of vehicles as the candidate participant vehicles of the candidate TVVS.

If in block 506, the task manager 206 determines that the initial available processing resources of the candidate TVVS at the first timestamp satisfy the processing resource requirement of the computational task, the method 500 proceeds to block 508. In block 508, the task manager 206 may estimate the future available processing resources of the candidate TVVS at a second timestamp subsequent to the first timestamp. In some embodiments, the second timestamp may be the target completion timestamp by which the computational task needs to be completed, and may be determined based on the first timestamp and the task duration of the computational task (e.g., the time distance between the two timestamps may be the task duration). In some embodiments, the TVVS manager 204 may determine the vehicle movement data of the candidate participant vehicles. For example, the TVVS manager 204 may receive the vehicle movement data from the candidate participant vehicles or retrieve their vehicle movement data from the data store 126.

In some embodiments, the task manager 206 may estimate the future available processing resources of the candidate TVVS at the second timestamp based on the vehicle movement data of the candidate participant vehicles. In particular, the TVVS manager 204 may evaluate the vehicle movement data of the candidate participant vehicles, and determine first candidate participant vehicles proximately located relative to one another on the road segment at the second timestamp from the candidate participant vehicles. The candidate TVVS may potentially comprise the first candidate participant vehicles at the second timestamp, and thus these first candidate participant vehicles may contribute their available processing resources to the resource pool 252 of the candidate TVVS at the second timestamp if the candidate TVVS is actually established. In some embodiments, the first candidate participant vehicles may be determined from the candidate participant vehicles of the candidate TVVS in a manner similar to the second participant vehicles being determined from the first participant vehicles of the first TVVS 109 discussed above with reference to FIG. 4, and thus not repeated again for brevity. In some embodiments, the task manager 206 may aggregate the available processing resources of the first candidate participant vehicles into the estimated future available processing resources of the candidate TVVS at the second timestamp.

In block 510, the task manager 206 may determine whether the estimated future available processing resources of the candidate TVVS at the second timestamp satisfy the processing resource requirement of the computational task. If in block 510, the task manager 206 determines that the estimated future available processing resources of the candidate TVVS at the second timestamp do not satisfy the processing resource requirement of the computational task, the method 500 proceeds to block 502 to determine another set of vehicles as the candidate participant vehicles of the candidate TVVS. If in block 510, the task manager 206 determines that the estimated future available processing resources of the candidate TVVS at the second timestamp satisfy the processing resource requirement of the computational task, the method 500 proceeds to block 512.

In block 512, the TVVS manager 204 may instruct the candidate participant vehicles to form a new TVVS 109 corresponding to the candidate TVVS. As discussed above, the task manager 206 may determine that the initial available processing resources of the candidate TVVS at the first timestamp satisfy the processing resource requirement of the computational task (e.g., in block 506), and that the estimated future available processing resources of the candidate TVVS at the second timestamp also satisfy the processing resource requirement of the computational task (e.g., in block 510). Therefore, the task manager 206 may determine that the candidate TVVS potentially has enough processing resources to complete the execution of the computational task, and thus the computational task is executable on the candidate TVVS. The TVVS manager 204 may then instruct the candidate participant vehicles to form the new TVVS 109 corresponding to the candidate TVVS. Referring back to FIG. 4, in block 434, the task manager 206 may select the new TVVS 109 to execute the computational task.

Referring back to FIG. 3, once the local management server 107 determines the computing entity to execute the computational task, the local management server 107 may assign the computational task to the determined computing entity. For example, the local management server 107 may assign the computational task to the existing first TVVS 109 or to the new TVVS 109 determined as capable of executing the computational task as discussed above to perform the task execution. In block 318, the local management server 107 may generate and transmit a task execution instruction to the determined computing entity (e.g., the first TVVS 109). In some embodiments, the task execution instruction may include the task metadata and the task description of the computational task. If the computing entity determined to execute the computational task is the same as the computing entity receiving the computational task from the requesting entity, the task execution instruction may not include the task data of the computational task, but only instruct the computing entity to execute the computational task itself.

In some embodiments, the task execution instruction may instruct the determined computing entity to use enhanced input data to execute the computational task if applicable. In particular, the local management server 107 may determine that the task input data of the computational task is associated with a road segment (e.g., road scene images), the computing entity determined to execute the computational task is also located on the road segment and has sensing capabilities (e.g., the first TVVS 109). Thus, the local management server 107 may instruct the first TVVS 109 to determine additional input data associated with the road segment, the additional input data may be generated by the sensors 113 of the first participant vehicles included in the first TVVS 109. The local management server 107 may instruct the first TVVS 109 to perform the execution of the computational task using the task input data of the computational task and the additional input data. As the task input data can be enhanced with additional input data collected from different perspectives of the first participant vehicles, the execution of the computational task can be facilitated. In block 320, the determined computing entity (e.g., the first TVVS 109) may execute the computational task.

Figure 6B:
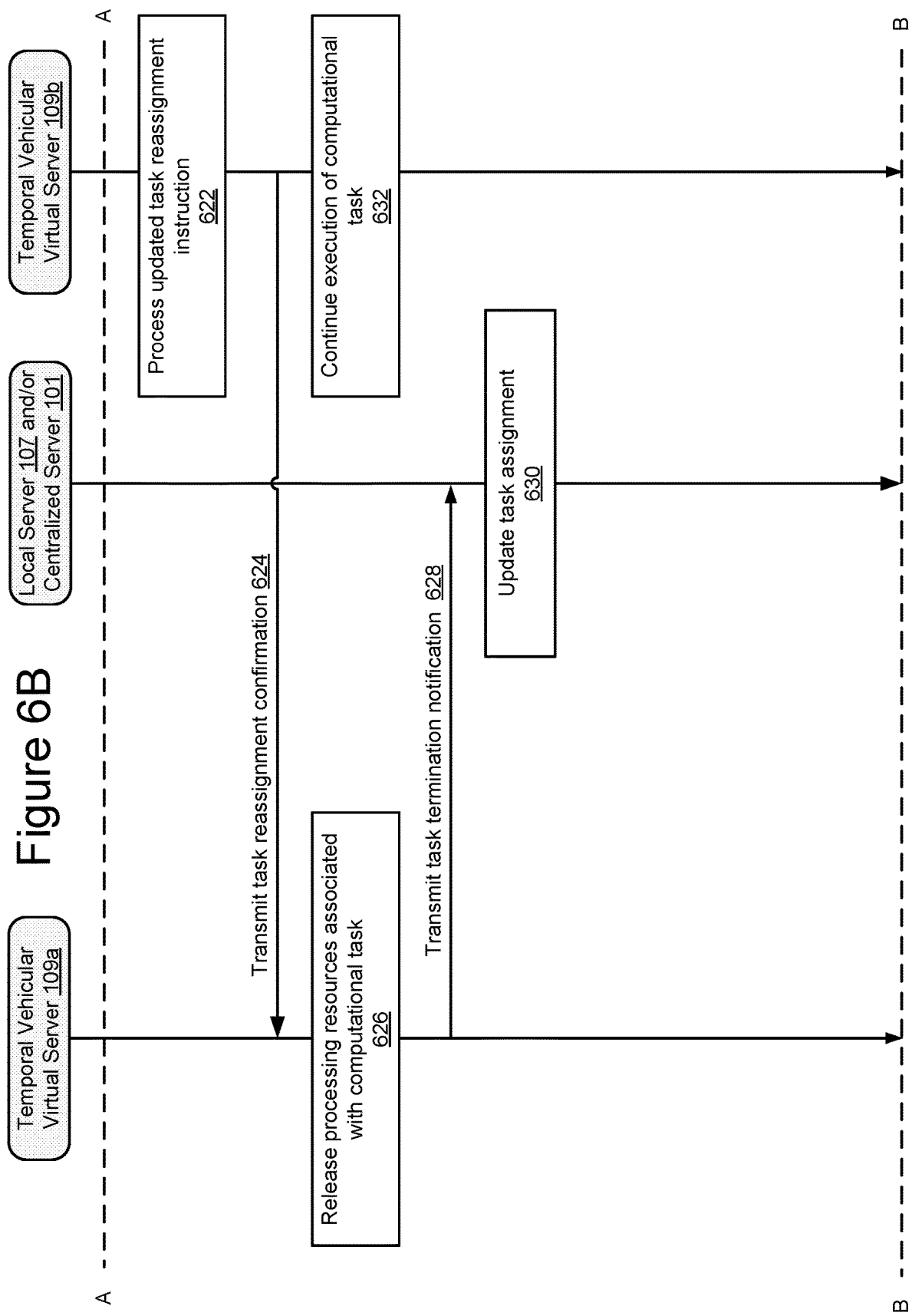

FIGS. 6A and 6B illustrate a flowchart of an example method 600 for reassigning a computational task. As discussed elsewhere herein, the available processing resources of the TVVS 109 may significantly change over time due to the vehicle movement of the participant vehicles. Therefore, a computational task being executed on the TVVS 109 may need to be reassigned to another computing entity as the available processing resources of the TVVS 109 become insufficient to complete the execution of the computational task. In block 602, the local management server 107 may generate and transmit a task execution instruction to a first TVVS 109a. The task execution instruction may instruct the first TVVS 109a to execute a computational task. As discussed elsewhere herein, the task execution instruction may include the task metadata and the task description of the computational task.

In block 604, the first TVVS 109a may execute the computational task. In particular, in the first TVVS 109a, the message processor 202 may analyze the task execution instruction to extract the task metadata and the task description of the computational task, the task metadata may include the processing resource requirement of the computational task as discussed elsewhere herein. The resource manager 210 may allocate the processing resources in the resource pool 252 to the computational task according to the amount of various resource components specified in the processing resource requirement. The task executor 208 may then use the allocated processing resources to perform the execution of the computational task.

Figure 8:
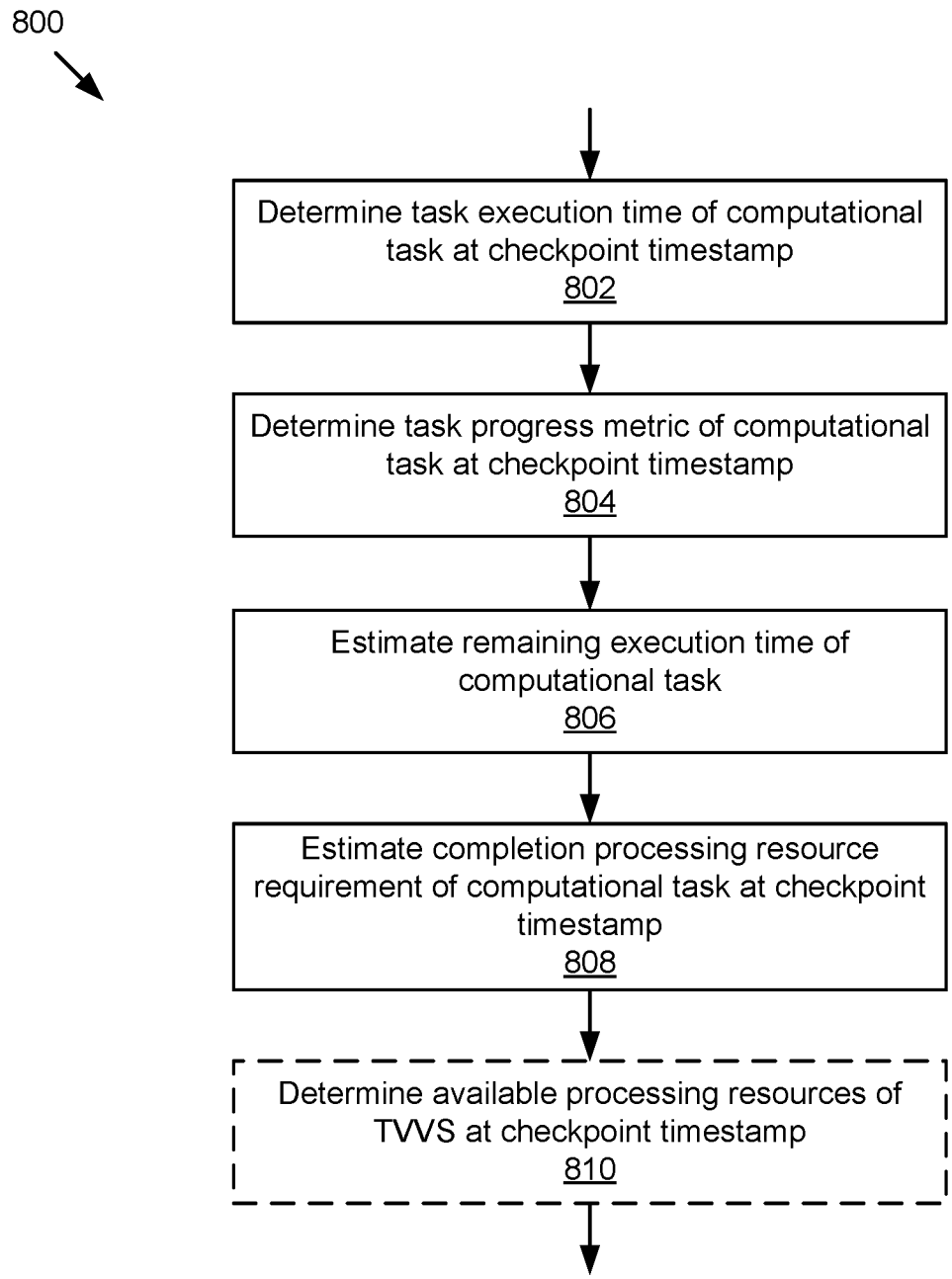
FIG. 8 is a flowchart of an example method for monitoring an execution of a computational task.

In block 606, the first TVVS 109a may monitor the execution of the computational task. In particular, in the first TVVS 109a, the task executor 208 may frequently determine multiple task performance metrics describing the execution of the computational task at multiple checkpoint timestamps (e.g., every 2 s, etc.). In some embodiments, a checkpoint timestamp may be a timestamp during the execution of the computational task. FIG. 8 is a flowchart of an example method 800 for monitoring the execution of the computational task. In block 802, the task executor 208 may determine the task execution time of the computational task, the task execution time may indicate the amount of time during which the computational task has been executed until the checkpoint timestamp (e.g., 8 s). In block 804, the task executor 208 may determine the task progress metric of the computational task. In particular, the task executor 208 may determine the task completion percentage of the computational task at the checkpoint timestamp (e.g., 88%). The task executor 208 may also compute the task execution speed of the computational task. In some embodiments, the task execution speed may indicate the speed at which the computational task is executed by the task executor 208, and may be computed as the ratio between the task completion percentage and the task execution time of the computational task (e.g., 11%/s). Other types of task progress metric are also possible and contemplated.

In block 806, the task executor 208 may estimate the remaining execution time of the computational task, the remaining execution time may indicate the amount of additional time needed to complete the computational task from the checkpoint timestamp (e.g., 7 s). In block 808, the task executor 208 may estimate the completion processing resource requirement of the computational task, the completion processing resource requirement may describe the requirement of various resource components to complete the execution of the computational task at the checkpoint timestamp. In some embodiments, the completion processing resource requirement may include a completion computation profile and a completion communication profile. The completion computation profile may specify the amount of computing resource, the amount of data storage resource, the amount of memory resource, the amount of sensing resource, etc. required to complete the execution of the computational task at the checkpoint timestamp. The completion communication profile may specify various factors that can be used to compute the amount of communication resource required to complete the execution of the computational task at the checkpoint timestamp. In some embodiments, the task executor 208 may update the computational task entry associated with the computational task in the virtual data store 128 to include these updated values of the task performance metrics. In block 810, the resource manager 210 may optionally determine the available processing resources of the first TVVS 109*a* at the checkpoint timestamp. As discussed elsewhere herein, the resource manager 210 may determine the quantities of available processing resources contributed by each participant vehicle of the first TVVS 109*a* at the checkpoint timestamp, and the total quantities of available processing resources in the resource pool 252 of the first TVVS 109*a* at the checkpoint timestamp.

Referring back to FIG. 6A, in block 608, the first TVVS 109*a* may transmit a task execution status to the local management server 107. In particular, in the first TVVS 109*a*, the message processor 202 may generate the task execution status including the task ID of the computational task, the task performance metrics of the computational task at a first checkpoint timestamp, and/or the available processing resources of the first TVVS 109*a* at the first checkpoint timestamp. The message processor 202 may then transmit the task execution status to the local management server 107. In block 610, the local management server 107 may process the task execution status. In particular, in the local management server 107, the message processor 202 may analyze the task execution status to extract the task ID of the computational task, the task performance metrics of the computational task, and/or the available processing resources of the first TVVS 109*a* at the first checkpoint timestamp. As discussed above, the task performance metrics may include the task execution time, the task progress metric (e.g., the task completion percentage, the task execution speed, etc.), the estimated remaining execution time, the completion processing resource requirement, etc. of the computational task at the first checkpoint timestamp.

Figure 9:
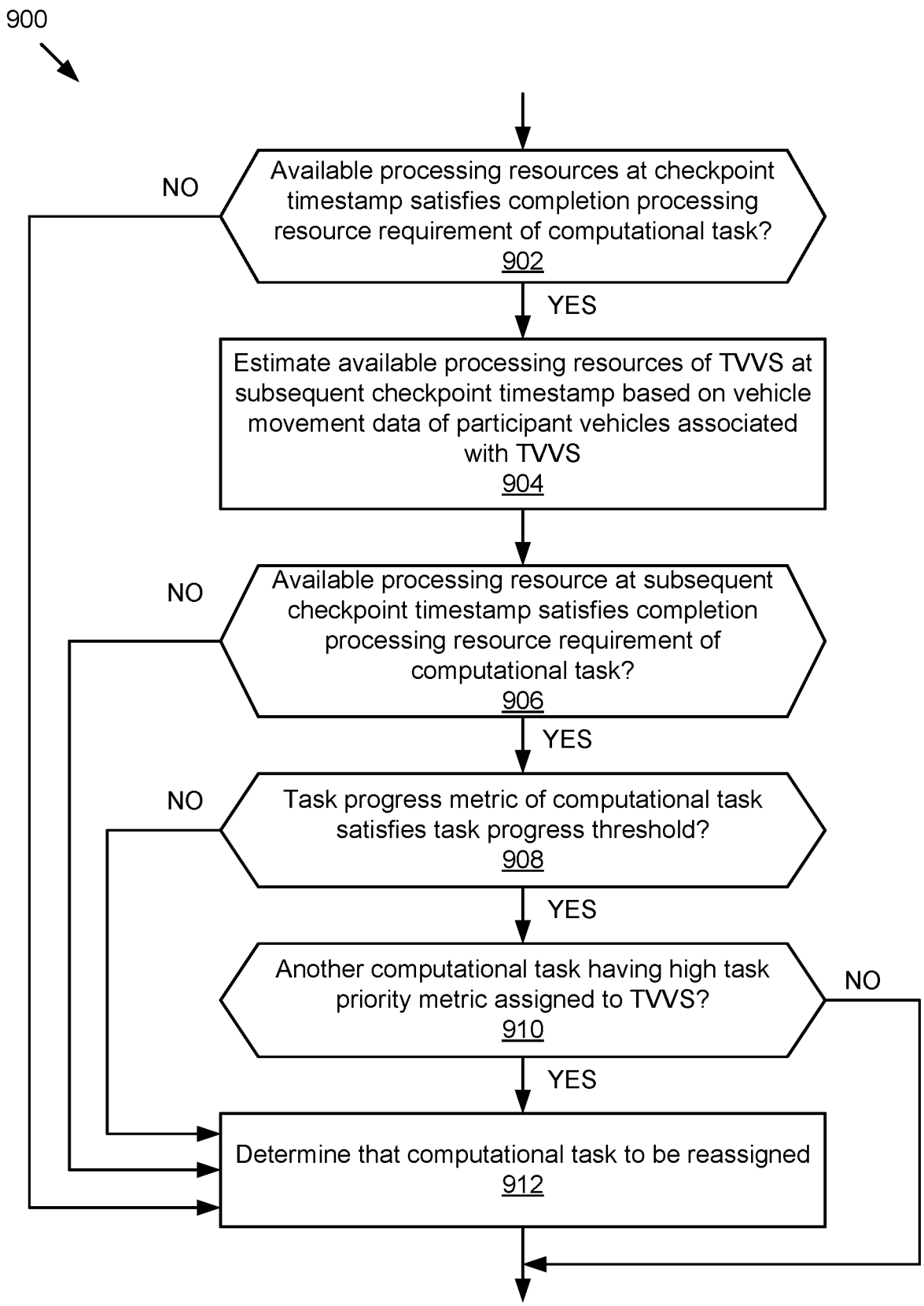
FIG. 9 is a flowchart of an example method for determining whether to reassign a computational task.

In block 612, the local management server 107 may determine whether to reassign the computational task at the first checkpoint timestamp. In particular, in the local management server 107, the task manager 206 may evaluate the task performance metrics of the computational task and/or the available processing resources of the first TVVS 109*a* at the first checkpoint timestamp to determine whether the computational task needs to be reassigned. FIG. 9 is a flowchart of an example method 900 for determining whether to reassign the computational task. In block 902, the task manager 206 may determine whether the available processing resources of the first TVVS 109*a* at the first checkpoint timestamp satisfy the completion processing resource requirement of the computational task. If in block 902, the task manager 206 determines that the available processing resources of the first TVVS 109*a* at the first checkpoint timestamp do not satisfy the completion processing resource requirement of the computational task, the task manager 206 may determine that the first TVVS 109*a* is incapable of completing the execution of the computational task because its current available processing resources are insufficient. The method 900 then proceeds to block 912. In block 912, the task manager 206 may determine that the computational task is to be reassigned.

In block 904, the task manager 206 may estimate the available processing resources of the first TVVS 109*a* at a second checkpoint timestamp subsequent to the first checkpoint timestamp. In some embodiments, the second checkpoint timestamp may be the second timestamp by which the computational task needs to be completed. In some embodiments, the second checkpoint timestamp may be determined based on the first checkpoint timestamp and a predefined checkpoint interval (e.g., the time distance between the two checkpoint timestamps may be a predefined checkpoint interval of 3 s). In some embodiments, the task manager 206 may estimate the available processing resources of the first TVVS 109*a* at the second checkpoint timestamp based on the vehicle movement data of the participant vehicles included in the first TVVS 109*a*.

In particular, the TVVS manager 204 may retrieve the vehicle cluster data of the first TVVS 109*a* from the data store 126 and determine that the first TVVS 109*a* comprises first participant vehicles travelling on a road segment at the first checkpoint timestamp. In some embodiments, the TVVS manager 204 may determine the vehicle movement data of the first participant vehicles. For example, the TVVS manager 204 may receive the vehicle movement data from the first participant vehicles or retrieve their vehicle movement data from the data store 126. In some embodiments, the TVVS manager 204 may evaluate the vehicle movement data of the first participant vehicles, and determine second participant vehicles proximately located relative to one another on the road segment at the second checkpoint timestamp from the first participant vehicles. The first TVVS 109*a* may potentially comprise the second participant vehicles at the second checkpoint timestamp, and thus these second participant vehicles may contribute their available processing resources to the resource pool 252 of the first TVVS 109*a* at the second checkpoint timestamp. In some embodiments, the task manager 206 may aggregate the available processing resources of the second candidate participant vehicles into the estimated available processing resources of the first TVVS 109*a* at the second checkpoint timestamp.

In block 906, the task manager 206 may determine whether the estimated available processing resources of the first TVVS 109*a* at the second checkpoint timestamp satisfy the completion processing resource requirement of the computational task. If in block 906, the task manager 206 determines that the estimated available processing resources of the first TVVS 109*a* at the second checkpoint timestamp do not satisfy the completion processing resource requirement of the computational task, the task manager 206 may determine that the first TVVS 109*a* is incapable of completing the execution of the computational task, because its available processing resources may soon decrease and become insufficient to continue the task execution. The method 900 then proceeds to block 912. In block 912, the task manager 206 may determine that the computational task is to be reassigned. As the computational task may be reassigned even before the available processing resources of the first TVVS 109*a* become insufficient to complete the computational task, the risk of task failure associated with the computational task can be reduced, the task output data can be delivered to the requesting entities on time, thereby providing the required quality of service.

In block 908, the task manager 206 may determine whether the task progress metric of the computational task satisfies a predefined task progress threshold. As discussed elsewhere herein, the task progress metric of the computational task may include the task completion percentage, the task execution speed, etc. of the computational task. If in block 908, the task manager 206 determines that the task progress metric of the computational task satisfies the predefined task progress threshold, the method 900 proceeds to block 912. In block 912, the task manager 206 may determine that the computational task is to be reassigned, because the computational task has not been efficiently executed. As an example, the task manager 206 may determine that the task execution speed of the computational task satisfies the predefined task execution speed threshold (e.g., less than 5%/s), and therefore determine to reassign the computational task.

In some embodiments, the task manager 206 may evaluate the task execution speed, the task completion percentage, and/or the remaining execution time of the computational task to determine whether the computation task is to be reassigned. As an example, assuming that the computational task has the task execution speed of 3%, the task completion percentage of 90%, and the estimated remaining execution time of 15 s at the first checkpoint timestamp as extracted from the task execution status. In this example, the task manager 206 may determine that the task execution speed of the computational task satisfies the predefined task execution speed threshold (e.g., less than 5%/s) but the task completion percentage of the computational task does not satisfy a predefined task completion percentage threshold (e.g., less than 75%). In this example, because the execution of the computational task is close to completion (the task completion percentage=90%), the processing resources required to perform the task reassignment to another computing entity may be higher than the processing resources required to complete the computational task on the first TVVS 109*a*. Therefore, the task manager 206 may determine not to reassign the computational task to reserve the processing resources required to perform the task reassignment.

In block 910, the task manager 206 may determine whether another computational task having high task priority metric is assigned to the first TVVS 109*a*. In particular, the task manager 206 may retrieve the task assignment entries associated with the first TVVS 109*a* from the task assignment list in the data store 126, and determine whether the first TVVS 109*a* is assigned another computational task that has the task priority metric satisfying a predefined task priority metric threshold (e.g., higher than 0.8). If in block 910, the task manager 206 determines that another computational task having high task priority metric is assigned to the first TVVS 109*a*, the method 900 proceeds to block 912. In block 912, the task manager 206 may determine that the computational task is to be reassigned, so that the processing resources allocated to the computational task in the resource pool 252 can be reallocated for the execution of the another computational task.

Referring back to FIG. 6A, if in block 612, the local management server 107 determines not to reassign the computational task at the first checkpoint timestamp, the first TVVS 109*a* may continue the execution of the computational task. If in block 612, the local management server 107 determines to reassign the computational task at the first checkpoint timestamp (e.g., because the first TVVS 109*a* is incapable of completing the execution of the computational task and/or because the task progress metric of the computational task satisfies a predefined task progress threshold, etc.), the method 600 proceeds to block 614. In block 614, the local management server 107 may determine a computing entity to continue the execution of the computational task. The local management server 107 may then reassign the computational task from the first TVVS 109*a* to the determined computing entity. In some embodiments, determining the computing entity to continue the execution of the computational task at the first checkpoint timestamp may be performed in a manner similar to determining the computing entity to perform the execution of the computational task as discussed above with reference to FIGS. 4 and 5.

For example, in the local management server 107, the task manager 206 may determine the completion processing resource requirement of the computational task. As discussed elsewhere herein, the completion processing resource requirement of the computational task may describe the requirement of various resource components to complete the execution of the computational task at the first checkpoint timestamp and may be extracted from the task execution status. As discussed elsewhere herein, the local management server 107 may manage a set of TVVSs including one or more TVVSs 109 located on the road segment within its coverage area 192, each TVVS 109 in the set of TVVSs may comprise participant vehicles proximately located relative to one another on the road segment at the first checkpoint timestamp. In some embodiments, the TVVS manager 204 may determine the set of TVVSs, and the task manager 206 may evaluate the TVVSs 109 in the set of TVVSs to determine a second TVVS 109*b* capable of continuing the execution of the computational task. In some embodiments, other sets of TVVSs located within the coverage areas 192 of other local servers 107 may also be evaluated to determine the second TVVS 109*b*.

In some embodiments, for each TVVS 109 in the set of TVVSs, the task manager 206 may determine the available processing resources of the TVVS 109 at the first checkpoint timestamp and estimate the available processing resources of the TVVS 109 at a second checkpoint timestamp subsequent to the first checkpoint timestamp. In some embodiments, the second checkpoint timestamp may be the second timestamp by which the computational task needs to be completed. In some embodiments, the task manager 206 may retrieve the available processing resources of the TVVS 109 at the first checkpoint timestamp from the data store 126, and estimate the available processing resources of the TVVS 109 at the second timestamp based on the vehicle movement data of the participant vehicles included in the TVVS 109 as discussed elsewhere herein.

In some embodiments, the task manager 206 may select the second TVVS 109b from the set of TVVSs based on the completion processing resource requirement of the computational task, the available processing resources of the second TVVS 109b at the first checkpoint timestamp, and the estimated available processing resources of the second TVVS 109b at the second timestamp. For example, the task manager 206 may determine that the available processing resources of the second TVVS 109b at the first timestamp satisfy the completion processing resource requirement of the computational task, and/or determine that the available processing resources of the second TVVS 109b at the second timestamp satisfy the completion processing resource requirement of the computational task. Therefore, the task manager 206 may determine that the second TVVS 109b potentially has enough processing resources to continue and complete the execution of the computational task, and thus reassign the computational task from the first TVVS 109a to the second TVVS 109b to continue the task execution. In some embodiments, the TVVS manager 204 and the task manager 206 may form a new TVVS 109 as discussed elsewhere herein, and reassign the computational task to the new TVVS 109. It should be understood that the computational task may also be reassigned to other computing entities of the system 100 (e.g., the centralized servers 101, the local management server 107, other local servers 107, etc.) to continue the task execution.

In some embodiments, the task manager 206 may evaluate the communication resource requirement to determine the second TVVS 109b from the set of TVVSs to reassign the computational task. For example, to determine whether to reassign the computational task to a TVVS 109 in the set of TVVSs, the task manager 206 may determine the communication resource requirement of the computational task associated with the TVVS 109. In particular, the task manager 206 may estimate the amount of communication resource required to complete the execution of the computational task on the TVVS 109. Such amount of required communication resource may include the amount of communication resource to transmit the computational task from the first TVVS 109a to the TVVS 109 and the amount of communication resource to continue the execution of the computational task on the TVVS 109.

In some embodiments, the task manager 206 may determine the completion communication profile of the computational task. The completion communication profile may specify various factors that can be used to compute the amount of communication resource required to complete the execution of the computational task and may be extracted from the task execution status. In some embodiments, the completion communication profile may specify the input data size of the task input data, the output data size of the task output data, the executing data size of the task executing data (e.g., the virtual machine image of the computational task), the geolocation associated with the task input data, the geolocation associated with the task output data, etc. of the computational task. In some embodiments, the task manager 206 may determine the geographic location of the TVVS 109 at the first checkpoint timestamp and the geographic location of the first TVVS 109a at the first checkpoint timestamp. In some embodiments, the TVVSs 109 in the set of TVVSs may frequently transmit their TVVS geolocation to the local management server 107 (e.g., every 1 s) and thus, the task manager 206 may retrieve the TVVS geolocation of the TVVS 109 and the TVVS geolocation of the first TVVS 109a at the first checkpoint timestamp from the data store 126.

In some embodiments, the task manager 206 may estimate the amount of communication resource required to complete the execution of the computational task on the TVVS 109 using the completion communication profile of the computational task, the geographic location of the first TVVS 109a at the first checkpoint timestamp, and the geographic location of the TVVS 109 at the first checkpoint timestamp. In some embodiments, such amount of required communication resource may be directly proportional to the distance from the TVVS geolocation of the first TVVS 109a to the TVVS geolocation of the TVVS 109, the distance from the TVVS geolocation of the TVVS 109 to the geolocation associated with the task input data of the computational task, and/or the distance from the TVVS geolocation of the TVVS 109 to the geolocation associated with the task output data of the computational task. In some embodiments, such amount of required communication resource may also be directly proportional to the executing data size of the task executing data, the input data size of the task input data, the output data size of the task output data, etc. associated with the computational task.

In some embodiments, the task manager 206 may determine whether to reassign the computational task to the TVVS 109 based on the communication resource requirement of the computational task associated with the TVVS 109. For example, the task manager 206 may determine that the amount of communication resource required to complete the execution of the computational task on the TVVS 109 satisfies a predefined communication resource requirement threshold (e.g., less than 3 Mbps), and thus reassign the computational task from the first TVVS 109a to the TVVS 109. In some embodiments, the task manager 206 may only reassign the computational task to the TVVS 109 if the TVVS 109 potentially has enough processing resources to continue and complete the execution of the computational task, and the amount of communication resource required to complete the execution of the computational task on the TVVS 109 satisfies the predefined communication resource requirement threshold. This implementation is particularly advantageous because it avoids reassigning the computational task to the TVVS 109 that requires a massive amount of communication resource to receive the computational task from the first TVVS 109a and to continue the execution of the computational task on the TVVS 109. As a result, the utilization of the limited communication resource provided by V2X connections (e.g., V2V connections, V2I connections, etc.) can be optimized.

Referring back to FIG. 6A, in block 616, the local management server 107 may generate and transmit a task reassignment instruction to the first TVVS 109a. In some embodiments, the task reassignment instruction may instruct the first TVVS 109a to transfer the computational task to the computing entity determined to continue the execution of the computational task (e.g., the second TVVS 109b). The task reassignment instruction may include the task ID of the computational task and the TVVS ID of the second TVVS 109b. Responsive to receiving the task reassignment instruction, the first TVVS 109a may terminate the execution of the computational task on the first TVVS 109a. In block 618, the first TVVS 109a may update the task reassignment instruction to include the task data of the computational task. In particular, in the first TVVS 109a, the message processor 202 may analyze the task reassignment instruction to extract the task ID of the computational task and the TVVS ID of the second TVVS 109b. The task executor 208 may then retrieve the computational task entry associated with the computational task from the task execution list in the virtual data store 128 (e.g., using the task ID), and update the task reassignment instruction to include the task data stored in the computational task entry. As discussed elsewhere herein, the task data may include the task metadata specifying various properties of the computational task, the task description describing the computational task in an executable manner (e.g., the virtual machine image describing the current state of the computational task, etc.), and/or any other type of data that is necessary to continue the execution of the computational task.

In block 620, the first TVVS 109a may transmit the updated task assignment instruction to the second TVVS 109b. In block 622, the second TVVS 109b may process the updated task assignment instruction. In particular, in the second TVVS 109b, the message processor 202 may analyze the updated task assignment instruction to extract the task ID and other task data of the computational task. In block 624, the second TVVS 109b may generate and transmit a task reassignment confirmation to the first TVVS 109a. In some embodiments, the task reassignment confirmation may confirm that the computational task is received at the second TVVS 109b and the second TVVS 109b will take over the execution of the computational task. In some embodiments, the task reassignment confirmation may include the task ID of the computational task. In block 632, the second TVVS 109b may continue the execution of the computational task. In particular, in the second TVVS 109b, the task executor 208 may update the task execution list in the virtual data store 128 to include the computational task, and continue the execution of the computational task using the task data extracted from the updated task assignment instruction.

Responsive to receiving the task reassignment confirmation from the second TVVS 109b, in block 626, the first TVVS 109a may release the processing resources associated with the computational task. In particular, in the first TVVS 109a, the resource management 210 may release the processing resources allocated to the computational task in the resource pool 252 of the first TVVS 109a and update the resource allocation data of the first TVVS 109a accordingly. In some embodiments, the task executor 208 may retrieve the computational task entry associated with the computational task from the task execution list in the virtual data store 128 (e.g., using the task ID) and update the task execution status of the computational task in the computational task entry to be "reassignment completed."

In block 628, the first TVVS 109a may generate and transmit a task termination notification to the local management server 107. In some embodiments, the task termination notification may indicate that the computational task is transferred from the first TVVS 109a to the second TVVS 109b and the computational task is terminated on the first TVVS 109a. The task termination notification may include the task ID of the computational task and the TVVS ID of the second TVVS 109b. Responsive to receiving the task termination notification from the first TVVS 109a, in block 630, the local management server 107 may update the task assignment. In particular, in the local management server 107, the message processor 202 may analyze the task termination notification to extract the task ID of the computational task and the TVVS ID of the second TVVS 109b. The task manager 206 may then retrieve the task assignment entry associated with the computational task from the task assignment list in the data store 126 (e.g., using the task ID) and update the task assignment entry to associate the computational task with the second TVVS 109b. The task reassignment of the computational task from the first TVVS 109a to the second TVVS 109b is thereby completed.

Figure 7:
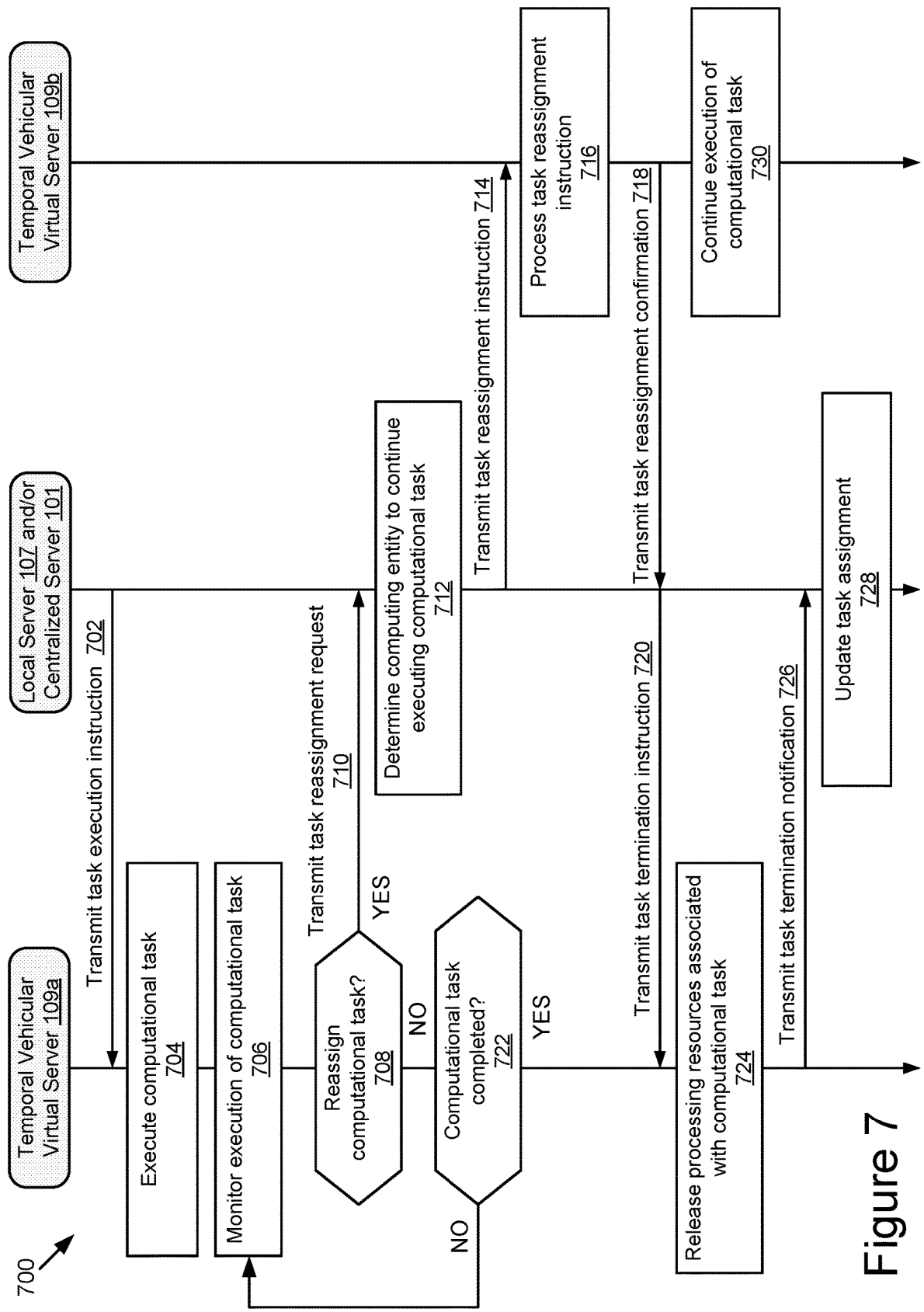
FIG. 7 illustrates a flowchart of a second example method for reassigning a computational task.

FIG. 7 is a flowchart of another example method 700 for reassigning a computational task. In block 702, the local management server 107 may generate and transmit a task execution instruction to a first TVVS 109a, the task execution instruction may instruct the first TVVS 109a to execute a computational task. In block 704, the first TVVS 109a may execute the computational task. In block 706, the first TVVS 109a may monitor the execution of the computational task. For example, the first TVVS 109a may determine multiple task performance metrics describing the execution of the computational task at a checkpoint timestamp and the available processing resources of the first TVVS 109a at the checkpoint timestamp. In block 708, the first TVVS 109a may determine whether to reassign the computational task at the checkpoint timestamp. In some embodiments, the first TVVS 109a may determine whether to reassign the computational task at the checkpoint timestamp in a manner similar to the local management server 107 determining whether to reassign the computational task at the first checkpoint timestamp as discussed above with reference to FIGS. 6A and 6B. For example, the first TVVS 109a may determine that the available processing resources in its resource pool 252 may soon decrease and become insufficient to complete the execution of the computational task (e.g., due to the departure of one or more participant vehicles). Therefore, the first TVVS 109a may determine that the computational task needs to be reassigned at the checkpoint timestamp.

If in block 708, the first TVVS 109a determines that the computational task needs to be reassigned at the checkpoint timestamp, the method 700 proceeds to block 710. In block 710, the first TVVS 109a may generate and transmit a task assignment request to the local management server 107. In some embodiments, the task assignment request may request the local management server 107 to reassign the computational task to another computing entity to continue the execution of the computational task. The task assignment request may include the task ID and other task data of the computational task. In block 712, the local management server 107 may determine a computing entity to continue the execution of the computational task. In some embodiments, the computing entity to continue the execution of the computational task may be determined in a similar manner as discussed above with references to FIG. 6A and 6B. For example, the local management server 107 may determine the computing entity to continue the execution of the computational task to be a second TVVS 109b.

In block 714, the local management server 107 may generate and transmit a task reassignment instruction to the second TVVS 109b. In some embodiments, the task reassignment instruction may instruct the second TVVS 109b to continue the execution of the computational task. The task reassignment instruction may include the task ID and other task data (e.g., task metadata, task description, etc.) of the computational task. In block 716, the second TVVS 109b may process the task reassignment instruction. In particular, the second TVVS 109b may analyze the task assignment instruction to extract the task ID and other task data of the computational task. In block 718, the second TVVS 109b may generate and transmit a task reassignment confirmation to the local management server 107. In some embodiments, the task reassignment confirmation may confirm that the computational task is received at the second TVVS 109b and the second TVVS 109*b* will continue the execution of the computational task. In some embodiments, the task reassignment confirmation may include the task ID of the computational task. In block 730, the second TVVS 109*b* may continue the execution of the computational task using the task data extracted from the task assignment instruction.

Responsive to receiving the task reassignment confirmation from the second TVVS 109*b*, in block 720, the local management server 107 may generate and transmit a task termination instruction to the first TVVS 109*a*. In some embodiments, the task termination instruction may instruct the first TVVS 109*a* to terminate the computational task. In some embodiments, the task termination instruction may include the task ID of the computational task. Responsive to receiving the task termination instruction from the local management server 107, the first TVVS 109*a* may terminate the execution of the computational task on the first TVVS 109*a*. In block 724, the first TVVS 109*a* may release the processing resources associated with the computational task. In some embodiments, the first TVVS 109*a* may retrieve the computational task entry associated with the computational task in the virtual data store 128 (e.g., using the task ID) and update the task execution status of the computational task in the computational task entry to be "reassignment completed."

In block 726, the first TVVS 109*a* may generate and transmit a task termination notification to the local management server 107. In some embodiments, the task termination notification may indicate that the execution of the computational task is terminated on the first TVVS 109*a*. Responsive to receiving the task termination notification from the first TVVS 109*a*, in block 728, the local management server 107 may update the task assignment. In particular, in the local management server 107, the task manager 206 may retrieve the task assignment entry associated with the computational task from the task assignment list in the data store 126 (e.g., using the task ID) and update the task assignment entry to associate the computational task with the second TVVS 109*b*. The task reassignment of the computational task from the first TVVS 109*a* to the second TVVS 109*b* is thereby completed If in block 708, the first TVVS 109*a* determines that the computational task does not need to be reassigned at the checkpoint timestamp, the method 700 proceeds to block 722. In block 722, the first TVVS 109*a* may determine whether the computational task is completed. If in block 722, the first TVVS 109*a* determines that the computational task is not completed, the method 700 proceeds to block 706 to continue monitoring the execution of the computational task as the computational task is executed on the first TVVS 109*a*. If in block 722, the first TVVS 109*a* determines that the computational task is completed, the first TVVS 109*a* may terminate the execution of the computational task. In block 724, the first TVVS 109*a* may release the processing resources associated with the computational task. In some embodiments, the first TVVS 109*a* may retrieve the computational task entry associated with the computational task in the virtual data store 128 (e.g., using the task ID) and update the task execution status of the computational task in the computational task entry to be "execution completed."

In block 726, the first TVVS 109*a* may generate and transmit a task termination notification to the local management server 107. In some embodiments, the task termination notification may indicate that the execution of the computational task is completed on the first TVVS 109*a*. Responsive to receiving the task termination notification from the first TVVS 109*a*, in block 728, the local management server 107 may update the task assignment. In some embodiments, as the execution of the computational task is completed, the local management server 107 may remove the task assignment entry associated with the computational task from the task assignment list in the data store 126.

Thus, as discussed above, the computational task may be assigned to the first TVVS 109*a* that has the initial available processing resources at the first time stamp (e.g., a current timestamp) satisfying the processing resource requirement of the computational task, and the future available processing resources at the second time stamp (e.g., the target completion timestamp) satisfying the processing resource requirement of the computational task. Therefore, it is likely that the first TVVS 109*a* can complete the execution of the computational task without the need of task reassignment. If during the execution of the computational task, the first TVVS 109*a* is incapable of completing the execution of the computational task as expected, the computational task may be timely reassigned to another computing entity (e.g., the second TVVS 109*b*) to complete the task execution. As discussed above, the computational task may be reassigned to the second TVVS 109*b* that has the initial available processing resources at the first checkpoint time stamp (e.g., a current timestamp) satisfying the processing resource requirement of the computational task, and the future available processing resources at the second time checkpoint stamp (e.g., the target completion timestamp) satisfying the completion processing resource requirement of the computational task. Therefore, it is likely that the second TVVS 109*b* can continue and complete the execution of the computational task without the need of another task reassignment. As a result, the performance requirement of the computational task can be satisfied with very limited risk of task failure. Thus, the quality of service can be improved, especially for time-sensitive and safety-critical computational tasks such as traffic situation detection, lane departure warning, emergency braking, etc.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
receiving a computational task;
determining a processing resource requirement of the computational task;
determining available processing resources of a first temporal vehicular virtual server (TVVS) at a first timestamp, the first TVVS comprising first participant vehicles proximally located relative to one another on a road segment at the first timestamp;
determining vehicle movement data of the first participant vehicles;
estimating available processing resources of the first TVVS at a second timestamp based on the vehicle movement data of the first participant vehicles, the second timestamp being subsequent to the first timestamp;
determining to execute the computational task on the first TVVS based on the processing resource requirement of the computational task, the available processing resources of the first TVVS at the first timestamp, and the estimated available processing resources of the first TVVS at the second timestamp; and responsive to determining to execute the computational task on the first TVVS, assigning the computational task to the first TVVS to perform an execution of the computational task.

2. The method of claim 1, wherein estimating the available processing resources of the first TVVS at the second timestamp includes:

determining, from the first participant vehicles, second participant vehicles proximally located relative to one another on the road segment at the second timestamp based on the vehicle movement data of the first participant vehicles, the first TVVS comprising the second participant vehicles at the second timestamp; and aggregating available processing resources of the second participant vehicles into the estimated available processing resources of the first TVVS at the second timestamp.

3. The method of claim 1, further comprising:

determining the second timestamp based on the first timestamp and a task duration of the computational task.

4. The method of claim 1, wherein the vehicle movement data of each participant vehicle included in the first participant vehicles specifies one or more of a vehicle speed, a vehicle geolocation, and a vehicle route of the participant vehicle.

5. The method of claim 1, further comprising:

determining, at a first checkpoint timestamp during the execution of the computational task, a completion processing resource requirement of the computational task;

determining available processing resources of the first TVVS at the first checkpoint timestamp;

determining that the first TVVS is incapable of completing the execution of the computational task based on the completion processing resource requirement of the computational task and the available processing resources of the first TVVS at the first checkpoint timestamp; and responsive to determining that the first TVVS is incapable of completing the execution of the computational task, reassigning the computational task.

6. The method of claim 1, further comprising:

determining, at a first checkpoint timestamp during the execution of the computational task, a completion processing resource requirement of the computational task;

determining that the first TVVS comprising second participant vehicles at the first checkpoint timestamp;

estimating available processing resources of the first TVVS at a second checkpoint timestamp based on vehicle movement data of the second participant vehicles, the second checkpoint timestamp being subsequent to the first checkpoint timestamp;

determining that the first TVVS is incapable of completing the execution of the computational task based on the completion processing resource requirement of the computational task and the estimated available processing resources of the first TVVS at the second checkpoint timestamp; and responsive to determining that the first TVVS is incapable of completing the execution of the computational task, reassigning the computational task.

7. The method of claim 1, further comprising:

determining a task progress metric of the computational task;

determining that the task progress metric of the computational task satisfies a predefined task progress threshold; and responsive to determining that the task progress metric of the computational task satisfies the predefined task progress threshold, reassigning the computational task.

8. The method of claim 1, further comprising:

determining that the computational task is to be reassigned at a checkpoint timestamp during the execution of the computational task;

determining a completion processing resource requirement of the computational task;

determining a set of TVVSs, each TVVS of the set comprising participant vehicles proximally located relative to one another on the road segment at the checkpoint timestamp, each TVVS having available processing resources at the checkpoint timestamp and estimated available processing resources at the second timestamp;

selecting, from the set of TVVSs, a second TVVS based on the completion processing resource requirement of the computational task, the available processing resources of the second TVVS at the checkpoint timestamp, and the estimated available processing resources of the second TVVS at the second timestamp; and reassigning the computational task to the second TVVS to continue the execution of the computational task.

9. The method of claim 1, further comprising:

determining that the computational task is to be reassigned at a checkpoint timestamp during the execution of the computational task;

determining a communication profile of the computational task;

determining a geographic location of the first TVVS at the checkpoint timestamp;

determining a geographic location of a second TVVS at the checkpoint timestamp, the second TVVS comprising participant vehicles proximally located relative to one another on the road segment at the checkpoint timestamp;

determining a communication resource requirement of the computational task associated with the second TVVS using the communication profile of the computational task, the geographic location of the first TVVS at the checkpoint timestamp, and the geographic location of the second TVVS at the checkpoint timestamp;

determining to reassign the computational task to the second TVVS based on the communication resource requirement of the computational task associated with the second TVVS; and responsive to determining to reassign the computational task to the second TVVS, reassigning the computational task to the second TVVS to continue the execution of the computational task.

10. The method of claim 9, wherein the communication profile of the computational task specifies one or more of an input data size of task input data, an output data size of task output data, a task execution data size, a frequency of request for the task input data, a frequency of request for the task output data associated with the computational task; and a geographical location of one or more computing entities from which the task input data of the computational task is received, and a geographical location of one or more computing entities to which the task output data the computational task is transmitted.

11. The method of claim 1, further comprising:
determining that task input data of the computational task is associated with the road segment; and
instructing the first TVVS to
   determine additional input data associated with the road segment, the additional input data being generated by one or more sensors of the first participant vehicles included in the first TVVS, and
   perform the execution of the computational task using the task input data of the computational task and the additional input data generated by the one or more sensors of the first participant vehicles.

12. A method comprising:
receiving a computational task;
determining a processing resource requirement of the computational task;
determining, from vehicles on a road segment, candidate participant vehicles proximally located relative to one another on the road segment at a first timestamp;
determining vehicle movement data of the candidate participant vehicles;
determining available processing resources of a candidate temporal vehicular virtual server (TVVS) at the first timestamp, the candidate TVVS comprising the candidate participant vehicles at the first timestamp;
estimating available processing resources of the candidate TVVS at a second timestamp based on the vehicle movement data of the candidate participant vehicles, the second timestamp being subsequent to the first timestamp;
determining that the computational task is executable on the candidate TVVS based on the processing resource requirement of the computational task, the available processing resources of the candidate TVVS at the first timestamp, and the estimated available processing resources of the candidate TVVS at the second timestamp;
responsive to determining that the computational task is executable on the candidate TVVS, instructing the candidate participant vehicles to form a TVVS; and
assigning the computational task to the TVVS to perform an execution of the computational task.

13. The method of claim 12, wherein the candidate participant vehicles have a relative distance to one another on the road segment satisfying a predefined relative distance threshold.

14. The method of claim 12, wherein determining that the computational task is executable on the candidate TVVS includes:
determining that the available processing resources of the candidate TVVS at the first timestamp satisfies the processing resource requirement of the computational task; and
determining that the estimated available processing resources of the candidate TVVS at the second timestamp satisfies the processing resource requirement of the computational task.

15. The method of claim 12, further comprising:
determining the second timestamp based on the first timestamp and a task duration of the computational task.

16. The method of claim 12, wherein estimating the available processing resources of the candidate TVVS at the second timestamp includes:
determining, from the candidate participant vehicles, first candidate participant vehicles proximally located relative to one another on the road segment at the second timestamp based on the vehicle movement data of the candidate participant vehicles, the candidate TVVS comprising the first candidate participant vehicles at the second timestamp; and
aggregating available processing resources of the first candidate participant vehicles into the estimated available processing resources of the candidate TVVS at the second timestamp.

17. A system comprising:
one or more processors;
one or more memories storing instructions that, when executed by the one or more processors, cause the system to:
   receive a computational task;
   determine a processing resource requirement of the computational task;
   determine available processing resources of a first temporal vehicular virtual server (TVVS) at a first timestamp, the first TVVS comprising first participant vehicles proximally located relative to one another on a road segment at the first timestamp;
   determine vehicle movement data of the first participant vehicles;
   estimate available processing resources of the first TVVS at a second timestamp based on the vehicle movement data of the first participant vehicles, the second timestamp being subsequent to the first timestamp;
   determine to execute the computational task on the first TVVS based on the processing resource requirement of the computational task, the available processing resources of the first TVVS at the first timestamp, and the estimated available processing resources of the first TVVS at the second timestamp; and
   responsive to determining to execute the computational task on the first TVVS, assign the computational task to the first TVVS to perform an execution of the computational task.

18. The system of claim 17, wherein to estimate the available processing resources of the first TVVS at the second timestamp includes:
determining, from the first participant vehicles, second participant vehicles proximally located relative to one another on the road segment at the second timestamp based on the vehicle movement data of the first participant vehicles, the first TVVS comprising the second participant vehicles at the second timestamp; and
aggregating available processing resources of the second participant vehicles into the estimated available processing resources of the first TVVS at the second timestamp.

19. The system of claim 17, wherein the instructions, when executed by the one or more processors, further cause the system to:
determine the second timestamp based on the first timestamp and a task duration of the computational task.

20. The system of claim 17, wherein the vehicle movement data of each participant vehicle included in the first participant vehicles specifies one or more of a vehicle speed, a vehicle geolocation, and a vehicle route of the participant vehicle.

21. The system of claim 17, wherein the instructions, when executed by the one or more processors, further cause the system to:

determine, at a first checkpoint timestamp during the execution of the computational task, a completion processing resource requirement of the computational task;

determine available processing resources of the first TVVS at the first checkpoint timestamp;

determine that the first TVVS is incapable of completing the execution of the computational task based on the completion processing resource requirement of the computational task and the available processing resources of the first TVVS at the first checkpoint timestamp; and responsive to determining that the first TVVS is incapable of completing the execution of the computational task, reassign the computational task.

22. The system of claim 17, wherein the instructions, when executed by the one or more processors, further cause the system to:

determine, at a first checkpoint timestamp during the execution of the computational task, a completion processing resource requirement of the computational task;

determine that the first TVVS comprising second participant vehicles at the first checkpoint timestamp;

estimate available processing resources of the first TVVS at a second checkpoint timestamp based on vehicle movement data of the second participant vehicles, the second checkpoint timestamp being subsequent to the first checkpoint timestamp;

determine that the first TVVS is incapable of completing the execution of the computational task based on the completion processing resource requirement of the computational task and the estimated available processing resources of the first TVVS at the second checkpoint timestamp; and responsive to determining that the first TVVS is incapable of completing the execution of the computational task, reassign the computational task.

23. The system of claim 17, wherein the instructions, when executed by the one or more processors, further cause the system to:

determine a task progress metric of the computational task;

determine that the task progress metric of the computational task satisfies a predefined task progress threshold; and responsive to determining that the task progress metric of the computational task satisfies the predefined task progress threshold, reassign the computational task.

24. The system of claim 17, wherein the instructions, when executed by the one or more processors, further cause the system to:

determine that the computational task is to be reassigned at a checkpoint timestamp during the execution of the computational task;

determine a completion processing resource requirement of the computational task;

determine a set of TVVSs, each TVVS of the set comprising participant vehicles proximally located relative to one another on the road segment at the checkpoint timestamp, each TVVS having available processing resources at the checkpoint timestamp and estimated available processing resources at the second timestamp;

select, from the set of TVVSs, a second TVVS based on the completion processing resource requirement of the computational task, the available processing resources of the second TVVS at the checkpoint timestamp, and the estimated available processing resources of the second TVVS at the second timestamp; and reassign the computational task to the second TVVS to continue the execution of the computational task.

25. The system of claim 17, wherein the instructions, when executed by the one or more processors, further cause the system to:

determine that the computational task is to be reassigned at a checkpoint timestamp during the execution of the computational task;

determine a communication profile of the computational task;

determine a geographic location of the first TVVS at the checkpoint timestamp;

determine a geographic location of a second TVVS at the checkpoint timestamp, the second TVVS comprising participant vehicles proximally located relative to one another on the road segment at the checkpoint timestamp;

determine a communication resource requirement of the computational task associated with the second TVVS using the communication profile of the computational task, the geographic location of the first TVVS at the checkpoint timestamp, and the geographic location of the second TVVS at the checkpoint timestamp;

determine to reassign the computational task to the second TVVS based on the communication resource requirement of the computational task associated with the second TVVS; and responsive to determining to reassign the computational task to the second TVVS, reassign the computational task to the second TVVS to continue the execution of the computational task.

26. The system of claim 25, wherein the communication profile of the computational task specifies one or more of an input data size of task input data, an output data size of task output data, a task execution data size, a frequency of request for the task input data, a frequency of request for the task output data associated with the computational task; and a geographical location of one or more computing entities from which the task input data of the computational task is received, and a geographical location of one or more computing entities to which the task output data the computational task is transmitted.

27. The system of claim 17, wherein the instructions, when executed by the one or more processors, further cause the system to:

determine that task input data of the computational task is associated with the road segment; and instruct the first TVVS to determine additional input data associated with the road segment, the additional input data being generated by one or more sensors of the first participant vehicles included in the first TVVS, and perform the execution of the computational task using the task input data of the computational task and the additional input data generated by the one or more sensors of the first participant vehicles.

28. A system comprising:

one or more processors;

one or more memories storing instructions that, when executed by the one or more processors, cause the system to:

receive a computational task;
determine a processing resource requirement of the computational task;
determine, from vehicles on a road segment, candidate participant vehicles proximally located relative to one another on the road segment at a first timestamp;
determine vehicle movement data of the candidate participant vehicles;
determine available processing resources of a candidate temporal vehicular virtual server (TVVS) at the first timestamp, the candidate TVVS comprising the candidate participant vehicles at the first timestamp;
estimate available processing resources of the candidate TVVS at a second timestamp based on the vehicle movement data of the candidate participant vehicles, the second timestamp being subsequent to the first timestamp;
determine that the computational task is executable on the candidate TVVS based on the processing resource requirement of the computational task, the available processing resources of the candidate TVVS at the first timestamp, and the estimated available processing resources of the candidate TVVS at the second timestamp;
responsive to determining that the computational task is executable on the candidate TVVS, instruct the candidate participant vehicles to form a TVVS; and
assign the computational task to the TVVS to perform an execution of the computational task.

29. The system of claim 28, wherein the candidate participant vehicles have a relative distance to one another on the road segment satisfying a predefined relative distance threshold.

30. The system of claim 28, wherein to determine that the computational task is executable on the candidate TVVS includes:
determining that the available processing resources of the candidate TVVS at the first timestamp satisfies the processing resource requirement of the computational task; and
determining that the estimated available processing resources of the candidate TVVS at the second timestamp satisfies the processing resource requirement of the computational task.

31. The system of claim 28, wherein the instructions, when executed by the one or more processors, further cause the system to:
determine the second timestamp based on the first timestamp and a task duration of the computational task.

32. The system of claim 28, wherein to estimate the available processing resources of the candidate TVVS at the second timestamp includes:
determining, from the candidate participant vehicles, first candidate participant vehicles proximally located relative to one another on the road segment at the second timestamp based on the vehicle movement data of the candidate participant vehicles, the candidate TVVS comprising the first candidate participant vehicles at the second timestamp; and
aggregating available processing resources of the first candidate participant vehicles into the estimated available processing resources of the candidate TVVS at the second timestamp.

* * * * *